US012515075B2

(12) United States Patent
Kuusela et al.

(10) Patent No.: US 12,515,075 B2
(45) Date of Patent: Jan. 6, 2026

(54) SYSTEMS AND METHODS FOR AUTOMATIC RADIOTHERAPY TREATMENT PLAN GENERATION USING A MACHINE LEARNING LANGUAGE PROCESSING MODEL

(71) Applicant: Siemens Healthineers International AG, Steinhausen (CH)

(72) Inventors: Esa Kuusela, Espoo (FI); Ismo Hautala, Espoo (FI)

(73) Assignee: Siemens Healthineers International AG, Steinhausen (CH)

(*) Notice: Subject to any disclaimer, the term of this patent is extended or adjusted under 35 U.S.C. 154(b) by 204 days.

(21) Appl. No.: 18/238,917

(22) Filed: Aug. 28, 2023

(65) Prior Publication Data

US 2025/0073494 A1    Mar. 6, 2025

(51) Int. Cl.
*A61N 5/10* (2006.01)
*G16H 10/60* (2018.01)
*G16H 20/40* (2018.01)

(52) U.S. Cl.
CPC .......... *A61N 5/1031* (2013.01); *G16H 10/60* (2018.01); *G16H 20/40* (2018.01)

(58) Field of Classification Search
None
See application file for complete search history.

(56) References Cited

U.S. PATENT DOCUMENTS

2022/0415472 A1* 12/2022 Hakala ................... G06N 3/092

FOREIGN PATENT DOCUMENTS

EP          4 176 926 A1    5/2023
WO    WO-2019/212804 A1   11/2019

OTHER PUBLICATIONS

Extended European Search Report dated Jan. 24, 2025 on EPO Application 24194369.5 (8 pages).
Liu Zhengliang et al: "RadOnc-GPT: A Large Language Model for Radiation Oncology", Nov. 6, 2023 (Nov. 6, 2023), XP093239571, Retrieved from the Internet: URL:https://arxiv.org/pdf/2309.10160 * the whole document*.

(Continued)

*Primary Examiner* — Hoon K Song
(74) *Attorney, Agent, or Firm* — Foley & Lardner LLP

(57) ABSTRACT

Embodiments described herein provide for radiotherapy treatment plan generation using a machine learning language processing model. A processor can present a user interface providing an interaction interface between a user and a machine learning language processing model. The processor can receive a first input comprising a first patient attribute of a patient. The processor can execute the machine learning language processing model using the first patient attribute as an input to generate a response requesting a second patient attribute. The processor can present the response requesting the second patient attribute of the patient. The processor can receive a second input comprising the second patient attribute of the patient. The processor can transmit the first patient attribute of the patient and the second patient attribute of the patient to a radiotherapy plan optimizer. The radiotherapy plan optimizer can be configured to generate a radiotherapy treatment plan for the patient.

20 Claims, 6 Drawing Sheets

(56) References Cited

OTHER PUBLICATIONS

Syed Khajamoinuddin et al: "Integrated Natural Language Processing and Machine Learning Models for Standardizing Radiotherapy Structure Names", Healthcare, vol. 8, No. 2, Apr. 30, 2020 (Apr. 30, 2020), p. 120, XP093239279, ISSN: 2227-9032, DOI: 10.3390/healthcare8020120 * the whole document*.
Invention Disclosure "langchain API Reference".

* cited by examiner

SYSTEMS AND METHODS FOR AUTOMATIC RADIOTHERAPY TREATMENT PLAN GENERATION USING A MACHINE LEARNING LANGUAGE PROCESSING MODEL

TECHNICAL FIELD

This application relates generally to generating a radiotherapy treatment plan using a machine learning language processing model.

BACKGROUND

Radiotherapy (or radiation therapy) treatment planning (RTTP) is a complex process that contains specific guidelines, protocols, and instructions adopted by different medical professionals, such as clinicians, medical device manufacturers, and the like. Typically, identifying and applying guidelines to implement radiation therapy treatment is performed by complex computer models that receive treatment objectives from a treating physician and identify suitable attributes of the RTTP. For instance, the treating physicians may identify the treatment modality (e.g., choose between the volumetric modulated arc therapy (VMAT) or intensity-modulated radiation therapy (IMRT)). The treating physician may then input various objectives and goals to be achieved via the treatment, such as dose objectives to be achieved for one or more structures of the patient. A software solution may then use various methods to calculate attributes of the patient's treatment, such as determining beam limiting device angles and radiation emitting attributes. In the case of IMRT, the beam delivery directions and a number of beams are the specifically relevant variables that must be decided, whereas, for VMAT, the software solution may need to choose the number of arcs and their corresponding start and stop angles.

RTTP creation typically involves a collaboration of multiple professionals with different skill sets. Especially important in this process is the interaction between the radiation oncologist and a plan generator, which can be a computer model configured to automatically generate radiotherapy treatment plans for patients based on the attributes of the patients. It is common that after the oncologist has first generated a plan for treatment using such a computer model, the oncologist may perform multiple rounds of additional interaction with the computer model because there were ambiguities in the original request, aspects of the plan needed to be improved, or the oncologist wanted to verify that better plans are not available.

SUMMARY

A computer model may require specific, mostly numeric, exact parameters to use as input to generate the radiotherapy treatment plan for a patient. Such parameters can be originally input by a user (e.g., an oncologist or other clinician) and then adjusted multiple times based on interactions between the patient and the user. The computer model can generate a new radiotherapy treatment plan for each adjustment and execution.

There is a need for a computer model to generate treatment attributes of a radiotherapy treatment plan using methods and systems that reduce the repetitive nature of generating and updating a radiotherapy treatment plan over multiple iterations. There is further a need for an improved AI modeling/training technique to train such a model that does not require extensive training datasets and is computationally efficient, cost-effective, and produces timely results.

Using the methods and systems discussed herein, a processor can use a machine learning language processing model (e.g., a large language model) to automatically generate a radiotherapy treatment plan. The processor can provide an interactive interface (e.g., an interaction interface) to a computing device accessed by a user (e.g., an oncologist or other clinician) in which the user can provide inputs (e.g., prompts) that indicate different patient attributes of a patient that can be used to generate a radiotherapy treatment plan. Patient attributes can be data that relates to the patient or a tumor of the patient, relates to past procedures the patient has experienced, characterizes or describes the patient or a tumor of the patient, or that characterizes treatment options (e.g., available treatment options) for the patient or a tumor of the patient. Examples of such patient attributes can include but are not limited to, potential methods of treating the patient, radiotherapy machine attributes, or treatment attributes (e.g., machine movement and/or dosage attributes of the treatment, frequency of the treatment, time periods between treatments, etc.) that can be used to treat the patient, characteristics about the patient (e.g., age, gender, height, weight, etc.), characteristics about tumors (e.g., location, size, width, etc.) on the patient, a history of treatment for the patient, etc. The processor can receive input patient attributes and execute the machine learning language processing model using the patient attributes as input to generate a response. The response can be a query for further, in some cases specific, patient attributes. The processor can compare the received patient attributes with templates that each include a different set of patient attributes that can be used to generate a radiotherapy treatment plan. Responsive to determining the patient attributes of a patient satisfy a condition of a template (e.g., determining there is enough data to generate a radiotherapy treatment plan for the patient), the processor can input the patient attributes into a radiotherapy plan optimizer to generate a radiotherapy treatment plan for the patient. The processor can transmit the generated radiotherapy treatment plan back to the user accessing the interaction interface. Accordingly, the processor implementing the systems and methods described herein can automatically generate an optimized radiotherapy treatment plan using a machine learning language processing model without iteratively updating or generating new radiotherapy treatment plans.

In an embodiment, a method may comprise presenting, by a processor, a user interface providing an interaction interface between a user and a machine learning language processing model; receiving, by the processor from the interaction interface, a first input comprising a first patient attribute of a patient; executing, by the processor, the machine learning language processing model using the first patient attribute of the patient as an input to generate a response requesting a second patient attribute of the patient; presenting, by the processor, the response requesting the second patient attribute of the patient at the interaction interface; receiving, by the processor from the interaction interface, a second input comprising the second patient attribute of the patient; and responsive to determining the first patient attribute and the second patient attribute satisfy a plan condition, transmitting, by the processor, the first patient attribute of the patient and the second patient attribute of the patient to a radiotherapy plan optimizer, wherein the radiotherapy plan optimizer is configured to generate a radiotherapy treatment plan for the patient based on the first patient attribute and the second patient attribute.

The method may include receiving, by the processor at the user interface, an input indicating the patient, wherein executing the machine learning language processing model comprises retrieving, by the processor, stored patient data regarding the patient from memory based on the input indicating the patient; and determining, by the processor, the response based on the input first patient attribute and the retrieved patient data.

The method may include retrieving, by the processor, a template from memory, the template comprising a list of types of patient attributes, wherein executing the machine learning language processing model comprises determining, by the processor, the response based on the input first patient attribute and the template.

Determining the response can include determining, by the processor, a first type of patient attribute of the list of types of patient attributes of the template based on the machine learning language processing model not receiving a value for the first type of patient attribute from the interaction interface; and determining, by the processor, the response requesting for a value of the first type of patient attribute.

The method may include comparing, by the processor, the first patient attribute and the second patient attribute with the template; and determining, by the processor, the first patient attribute and the second patient attribute satisfy the plan condition responsive to determining the first patient attribute and the second patient attribute satisfy a template condition of the template.

The method may include receiving, by the processor at the user interface, an input indicating the patient; presenting, by the processor at the user interface, patient data of the patient based on the input indicating the patient, the patient data comprising one or more patient attributes of the patient; and receiving, by the processor, a selection of the first patient attribute from the presented one or more patient attributes.

The method may include generating, by the processor, a vector of tokens representing the first patient attribute and the second patient attribute from the machine learning language processing model, wherein transmitting the first patient attribute of the patient and the second patient attribute of the patient to the radiotherapy plan optimizer comprises transmitting, by the processor, the vector of tokens representing the first patient attribute and the second patient attribute to the radiotherapy plan optimizer.

The method may include converting, by the processor, the vector of tokens representing the first patient attribute and the second patient attribute into a structured dataset, wherein transmitting the first patient attribute of the patient and the second patient attribute of the patient to the radiotherapy plan optimizer comprises transmitting, by the processor, the converted structured dataset to the radiotherapy plan optimizer.

The radiotherapy plan optimizer can be configured to generate the radiotherapy treatment plan by generating radiation dose information for treating the patient based at least on the first patient attribute and the second patient attribute.

The method may include receiving, by the processor from the user interface, an input indicating the radiotherapy treatment plan is incorrect; responsive to the input indicating the radiotherapy treatment plan is incorrect, executing, by the processor, the machine learning language processing model to generate a second response requesting a third patient attribute regarding the patient; presenting, by the processor, the second response requesting the third patient attribute of the patient at the interaction interface; receiving, by the processor from the interaction interface, a third input comprising the third patient attribute of the patient; and transmitting, by the processor, the first patient attribute of the patient, the second patient attribute of the patient, and the third patient attribute of the patient to the radiotherapy plan optimizer, wherein the radiotherapy plan optimizer is configured to generate a second radiotherapy treatment plan for the patient based on the first patient attribute, the second patient attribute, and the third patient attribute.

The method may include storing, by the processor, a training dataset comprising sets of text regarding radiotherapy treatment of patients; and training, by the processor, the machine learning language processing model using the sets of text regarding radiotherapy treatment of patients of the training dataset as input.

The method may include presenting, by the processor, the radiotherapy treatment plan at the user interface.

In another embodiment, a system can include a processor coupled to memory and configured to present a user interface providing an interaction interface between a user and a machine learning language processing model; receive, from the interaction interface, a first input comprising a first patient attribute of a patient; execute the machine learning language processing model using the first patient attribute of the patient as an input to generate a response requesting a second patient attribute of the patient; present the response requesting the second patient attribute of the patient at the interaction interface; receive, from the interaction interface, a second input comprising the second patient attribute of the patient; and responsive to determining the first patient attribute and the second patient attribute satisfy a plan condition, transmit the first patient attribute of the patient and the second patient attribute of the patient to a radiotherapy plan optimizer, wherein the radiotherapy plan optimizer is configured to generate a radiotherapy treatment plan for the patient based on the first patient attribute and the second patient attribute.

The processor can be further configured to receive, at the user interface, an input indicating the patient, wherein the processor is configured to execute the machine learning language processing model by retrieving stored patient data regarding the patient from memory based on the input indicating the patient; and determining the response based on the input first patient attribute and the retrieved patient data.

The processor can be further configured to retrieve a template from memory, the template comprising a list of types of patient attributes, wherein the processor is configured to execute the machine learning language processing model by determining the response based on the input first patient attribute and the template.

The processor can be configured to determine the response by determining a first type of patient attribute of the list of types of patient attributes of the template based on the machine learning language processing model not receiving a value for the first type of patient attribute from the interaction interface; and determining the response requesting for a value of the first type of patient attribute.

The processor can be further configured to compare the first patient attribute and the second patient attribute with the template; and determine the first patient attribute and the second patient attribute satisfy the plan condition responsive to determining the first patient attribute and the second patient attribute satisfy a template condition of the template.

The processor can be further configured to receive, at the user interface, an input indicating the patient; present, at the user interface, patient data of the patient based on the input indicating the patient, the patient data comprising one or more patient attributes of the patient; and receive a selection of the first patient attribute from the presented one or more patient attributes.

The processor can be further configured to generate a vector of tokens representing the first patient attribute and the second patient attribute from the machine learning language processing model, wherein the processor is configured to transmit the first patient attribute of the patient and the second patient attribute of the patient to the radiotherapy plan optimizer by transmitting the vector of tokens representing the first patient attribute and the second patient attribute to the radiotherapy plan optimizer.

The processor can be further configured to convert the vector of tokens representing the first patient attribute and the second patient attribute into a structured dataset, wherein the processor is configured to transmit the first patient attribute of the patient and the second patient attribute of the patient to the radiotherapy plan optimizer by transmitting the converted structured dataset to the radiotherapy plan optimizer.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
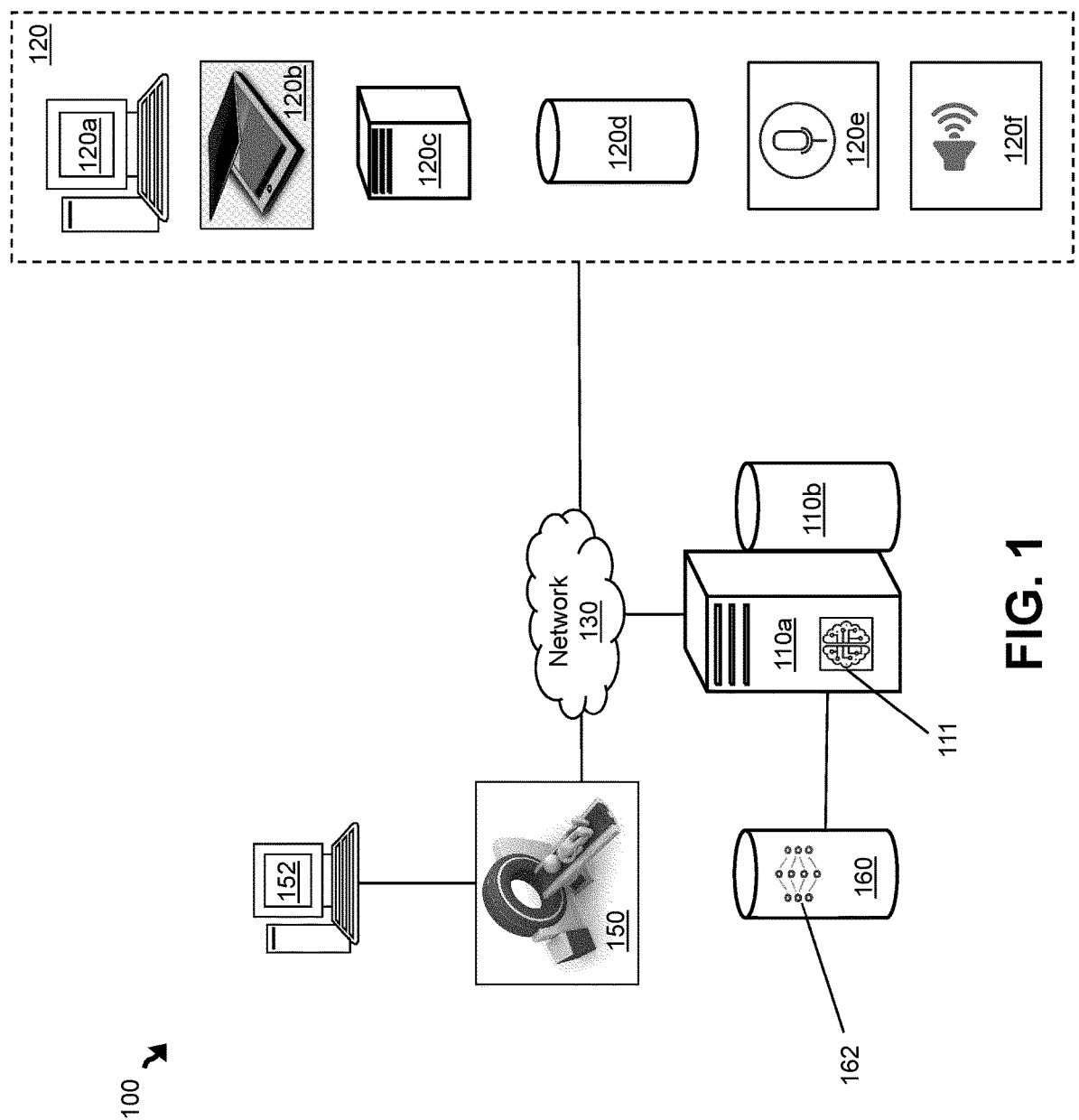
FIG. 1 illustrates components of a machine learning language processing plan generation system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1 illustrates components of a machine learning language processing plan generation system 100, according to an embodiment. The system 100 may include an analytics server 110a, a system database 110b, a machine learning language processing model 111, end-user devices 120a-f (collectively end-user devices 120), a medical device 150, a medical device computer 152, a database 160, and a radiotherapy plan optimizer 162. Various components depicted in FIG. 1 may belong to a radiation therapy treatment clinic at which patients may receive radiation therapy treatment, in some cases via one or more radiation therapy machines (e.g., the medical device 150).

The system 100 is not confined to the components described herein and may include additional or other components, not shown for brevity, which are to be considered within the scope of the embodiments described herein.

The above-mentioned components may be connected to each other through a network 130. Examples of the network 130 may include, but are not limited to, private or public local-area networks (LAN), wireless local-area networks (WLAN), metropolitan-area networks (MAN), wide-area networks (WAN), and the Internet. The network 130 may include wired and/or wireless communications according to one or more standards and/or via one or more transport mediums. The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), or EDGE (Enhanced Data for Global Evolution) network.

The analytics server 110a may generate and display an electronic platform configured to interface a user with the machine learning language processing model 111 and for receiving patient information and outputting the results of execution of the machine learning language processing model 111 and the radiotherapy plan optimizer 162. The electronic platform may include graphical user interfaces (GUI) displayed on each of the end-user devices 120, the medical device 150, and/or the medical device computer 152. An example of the electronic platform generated and hosted by the analytics server 110a may be a web-based application or a website configured to be displayed on different electronic devices, such as mobile devices, tablets, personal computers, and the like.

The information displayed by the electronic platform can include, for example, input elements to receive data associated with a patient to be treated (e.g., plan objectives) and display results of predictions produced by the machine learning language processing model 111 (e.g., text, images, or videos generated in response to inputs received through the electronic platform) and/or the radiotherapy plan optimizer 162 (e.g., a predicted radiotherapy plan). The analytics server 110a may then display the results for a medical professional and/or directly revise one or more operational attributes of the medical device 150. In some embodiments, the medical device 150 can be a diagnostic imaging devices or a treatment delivery device.

The analytics server 110a may be any computing device comprising a processor and non-transitory machine-readable storage capable of executing the various tasks and processes described herein. The analytics server 110a may employ various processors such as central processing units (CPU) and graphics processing unit (GPU), among others. Non-limiting examples of such computing devices may include workstation computers, laptop computers, server computers, and the like. While the system 100 includes a single analytics server 110a, the analytics server 110a may include any number of computing devices operating in a distributed computing environment, such as a cloud environment.

End-user devices 120 may be any computing device comprising a processor and a non-transitory machine-readable storage medium capable of performing the various tasks and processes described herein. Non-limiting examples of an end-user device 120 may be a workstation computer, laptop computer, tablet computer, and server computer. In operation, various users may use end-user devices 120 to access the GUI operationally managed by the analytics server 110a. Specifically, the end-user devices 120 may include a clinic computer 120a, a clinic server 120b, and a medical professional device 120c. Even though referred to herein as "end-user" devices, these devices may not always be operated by end-users. For instance, the clinic server 120b may not be directly used by an end user. However, the results stored on the clinic server 120b may be used to populate various GUIs accessed by an end user via the medical professional device 120c.

The medical device 150 may be a radiation therapy machine configured to implement a patient's radiotherapy treatment. The medical device 150 may also be in communication with a medical device computer 152 that is configured to display various GUIs discussed herein. For instance, the analytics server 110a may display the results predicted by the machine learning language processing model 111 and/or the radiotherapy plan optimizer 162 onto the computing devices described herein. In a non-limiting example, the GUI may display the responses generated by the machine learning language processing model 111 and radiotherapy treatment plans (RTTPs) generated by the radiotherapy plan optimizer 126 at the medical device computer 152 and/or the end-user devices 120.

The machine learning language processing model 111 may be stored in the system database 110b. The machine learning language processing model 111 may be configured or trained to automatically generate text, image, or video responses based on inputs received at a user interface. The machine learning language processing model 111 can be configured to receive patient attributes for a patient as input and automatically generate a response (e.g., a question or command) requesting patient attributes based on the received patient attributes. The machine learning language processing model 111 can hold or simulate a conversation with a user providing the inputs requesting more and/or different patient attributes over time. Upon receiving input patient attributes, both initially and for each iteration of inputs, the analytics server 110a (e.g., via the machine learning language processing model 111) can compare the patient attributes the analytics server 110a has received for the patient to one or more templates that the analytics server 110a has stored in the system database 110b. Responsive to determining the patient attributes satisfy a condition of a template (e.g., the patient attributes include enough patient attributes to exceed or satisfy a threshold or include a specific combination of patient attributes to satisfy a condition of a template), the machine learning language processing model 111 may stop responding to the user's inputs. The analytics server 110a can use the received patient attributes as input into the radiotherapy plan optimizer 162.

The analytics server 110a may execute a radiotherapy plan optimizer 162 to generate one or more treatment attributes for an RTTP complying with any radiation therapy plan objectives based on patient attributes of a patient for which the radiotherapy treatment plan is being generated. The radiotherapy plan optimizer 162 can be stored in the database 160. The radiotherapy plan optimizer 162 can generate the one or more treatment attributes, for example, by iteratively calculating the one or more treatment attributes where, with each iteration, the radiotherapy plan optimizer 162 can revise the one or more treatment attributes of the RTTP in accordance with a cost value.

The analytics server 110a may deploy the radiotherapy plan optimizer 162 to generate an RTTP for a patient based on patient attributes for the patient. The radiotherapy plan optimizer 162 may iteratively calculate one or more treatment attributes of the RTTP. For instance, with each iteration, the radiotherapy plan optimizer 162 may generate a candidate RTTP having various attributes. The plan optimizer 162 may then use one or more loss functions to calculate a cost value for the generated candidate RTTP. The cost value may indicate a likelihood of the candidate RTTP violating a set of rules, whether internal and/or external rules. For instance, the cost value may indicate whether the candidate RTTP violates any of the plan objectives. The radiotherapy plan optimizer 162 may analyze the cost value. If needed (e.g., when the cost value satisfies a threshold), the radiotherapy plan optimizer 162 may revise the candidate RTTP and re-execute its loss function to generate a new cost value. Depending on whether the new cost function is increasing or decreasing, the plan optimizer computer model may revise the candidate RTTP again and recalculate the cost value. The radiotherapy plan optimizer 162 may continue this iterative approach until it converges upon an RTTP (or the final RTTP) that has a cost value that satisfies a threshold.

The analytics server 110a can identify the treatment attributes that the radiotherapy plan optimizer 162 determined have a cost value that satisfies the threshold. The analytics server 110a can present the treatment attributes as an RTTP at the end-user device 120 being accessed by the user generating the radiotherapy treatment plan. The analytics server 110a can present the treatment attributes in the same interaction interface that the analytics server 110a was previously using to interface the user with the machine learning language processing model 111 or at a different portion of the user interface. The user can implement the RTTP or the analytics server 110a or the end-user device 120 can use the RTTP to automatically control the medical device 150 based on attributes of the RTTP to treat the patient.

Figure 2:
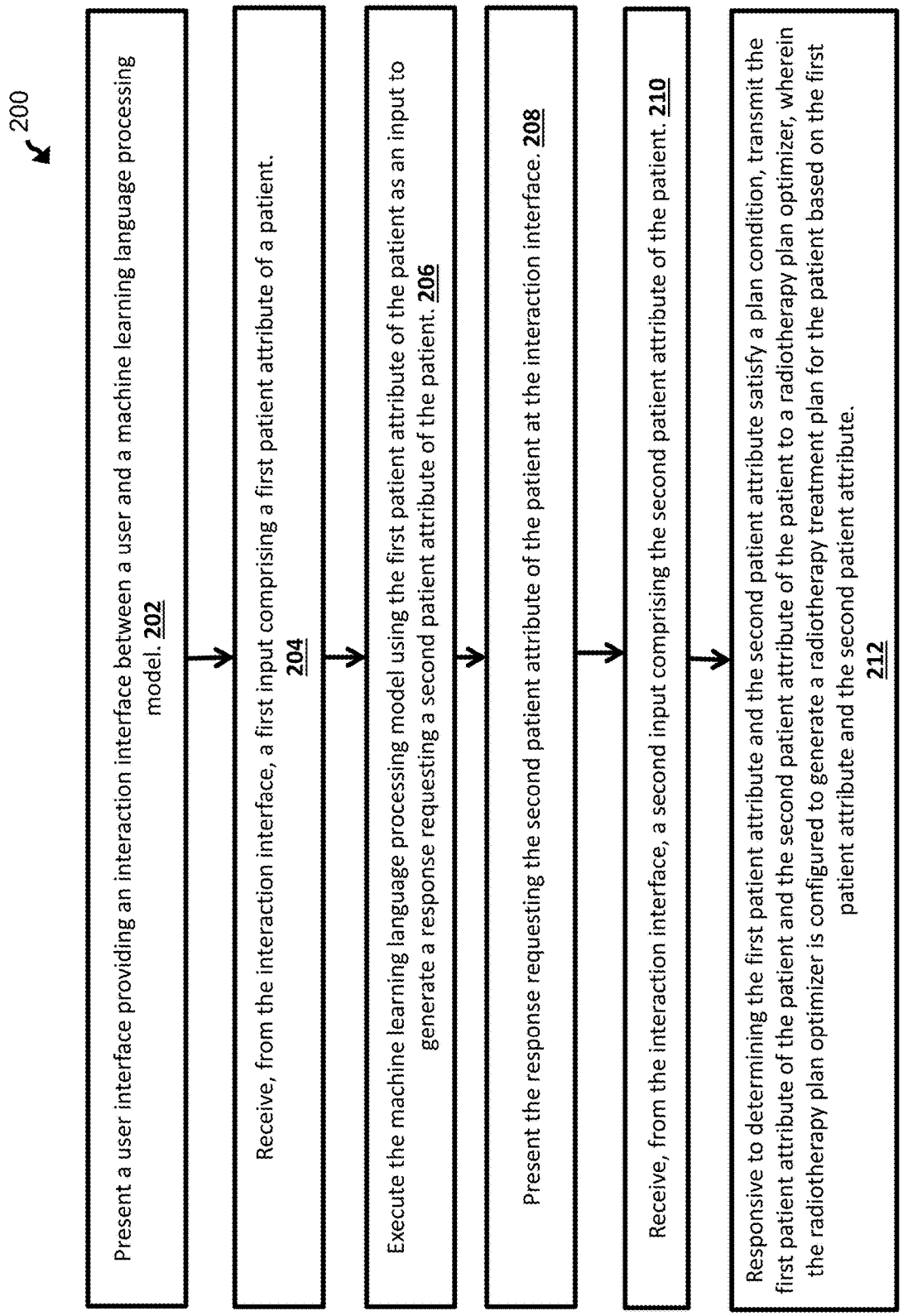
FIG. 2 illustrates a process flow diagram executed in a machine learning language processing plan generation system, according to an embodiment.

Referring to FIG. 2, a method 200 shows an operational workflow executed in a machine learning language processing plan generation system, in accordance with an embodiment. The method 200 may include steps 202-212. However, other embodiments may include additional or alternative steps or may omit one or more steps altogether. The method 200 is described as being executed by a server, such as the analytics server described in FIG. 1. However, one or more steps of the method 200 may be executed by any number of computing devices operating in the distributed computing system described in FIG. 1. For instance, one or more computing devices may locally perform part or all of the steps described in FIG. 2.

Using the method 200, the analytics server can implement a combination of a machine learning language processing model and a radiotherapy plan optimizer to generate a radiotherapy treatment plan. To do so, the analytics server can provide an interaction interface (e.g., a section or portion of a user interface, which the analytics server can also provide) to a computing device being accessed by a user (e.g., an oncologist or other clinician). Through the interaction interface, the user can input patient attributes of a patient or any other data. The analytics server can receive the inputs and provide the inputs to the machine learning language processing model. The machine learning language processing model can process the inputs and generate responses (e.g., text, images, video, etc.) based on the inputs. The responses can be questions requesting further patient attributes for the patient. The machine learning language processing model and the user can communicate through the interaction interface in this manner until the analytics server determines there is enough data or patient attributes to generate a radiotherapy treatment plan for the patient. The analytics server can input the data or patient attributes into a radiotherapy plan optimizer. Based on the input data or patient attributes, the radiotherapy plan optimizer can generate treatment attributes of a radiotherapy treatment plan for the patient. The analytics server can present the treatment attributes at the user interface, such as in the interaction interface, to the user. In some cases, the analytics server can transmit the treatment attributes to a radiation therapy machine itself to implement the radiotherapy treatment plan.

At step 202, the analytics server may present a user interface at a computing device. The analytics server may generate the user interface and transmit the user interface to the computing device over a network. The analytics server may generate and transmit the user interface to the computing device when providing an electronic platform that facilitates generation of radiotherapy treatment plans for patients based on inputs from users, such as oncologists or other clinicians.

The analytics server can generate the user interface to have an interaction interface. The interaction interface can be an interface that enables communication between a user viewing and providing inputs into an interaction interface and the analytics server or a machine learning language processing model. The machine learning language processing model can be a large language model that has been trained to generate text, image, and/or video responses to text, image, and/or video input. The machine learning language processing model can be or include a neural network, such as a neural network with a transformer architecture. The interaction interface can enable a form of communication similar to a conversation between two humans that can involve back-and-forth exchanges of messages between participants in the conversation. In this case, the two participants may be a user, such as an oncologist or other clinician, and the machine learning language processing model.

The interaction interface can simulate an instant messaging application conversation between the user and the machine learning language processing model. For example, a user can input text into the interaction interface. The interaction interface can be a feed (e.g., a user feed). The text can be or include patient attributes for a patient receiving radiotherapy treatment. For example, the user can select a send button to cause the text to be transmitted to the analytics server. The analytics server can input the text including the patient attributes into the machine learning language processing model and execute the machine learning language processing model. Based on the input, the language machine learning model may output a response (e.g., a question or command) in text. The analytics server may present the response in the interaction interface, such as below (e.g., directly or sequentially below) the most recent input text by the user. The user can respond to the response from the machine learning language processing model with text below the response and submit the user input response. This process can repeat any number of times to simulate an instant message application conversation.

The interaction interface can cover a portion of the user interface or be a widget of the user interface. The user interface can include other portions or widgets that offer differing functionality. For example, while the interaction interface can enable communication between the user and the machine learning language processing model, the analytics server can also include a portion of the user interface that displays different patient attributes of patients. For example, the user accessing the user interface may be accessing the user interface to generate a radiotherapy treatment plan for a patient. The user may input an identifier (e.g., a name) of the patient into the user interface or the platform provided by the analytics server. Responsive to receiving the input, the analytics server can retrieve patient data (e.g., one or more patient attributes) regarding the patient from memory. Examples of patient attributes the analytics server may retrieve include computed tomography (CT) scans of the patient or a tumor of the patient, images of the patient or a tumor of the patient, previously collected patient attributes of the patient such as data collected from previous health tests, etc. The analytics server can present the retrieved patient data on the user interface in another widget or a portion of the user interface separate or adjacent to the interaction interface. In some cases, the portion or widget of the user interface including the retrieved patient data can be separated from the interaction interface on the user interface by a line (e.g., a vertical line going across the width or length of the user interface (e.g., along the x-axis or the y-axis) of the user interface).

Figure 3:
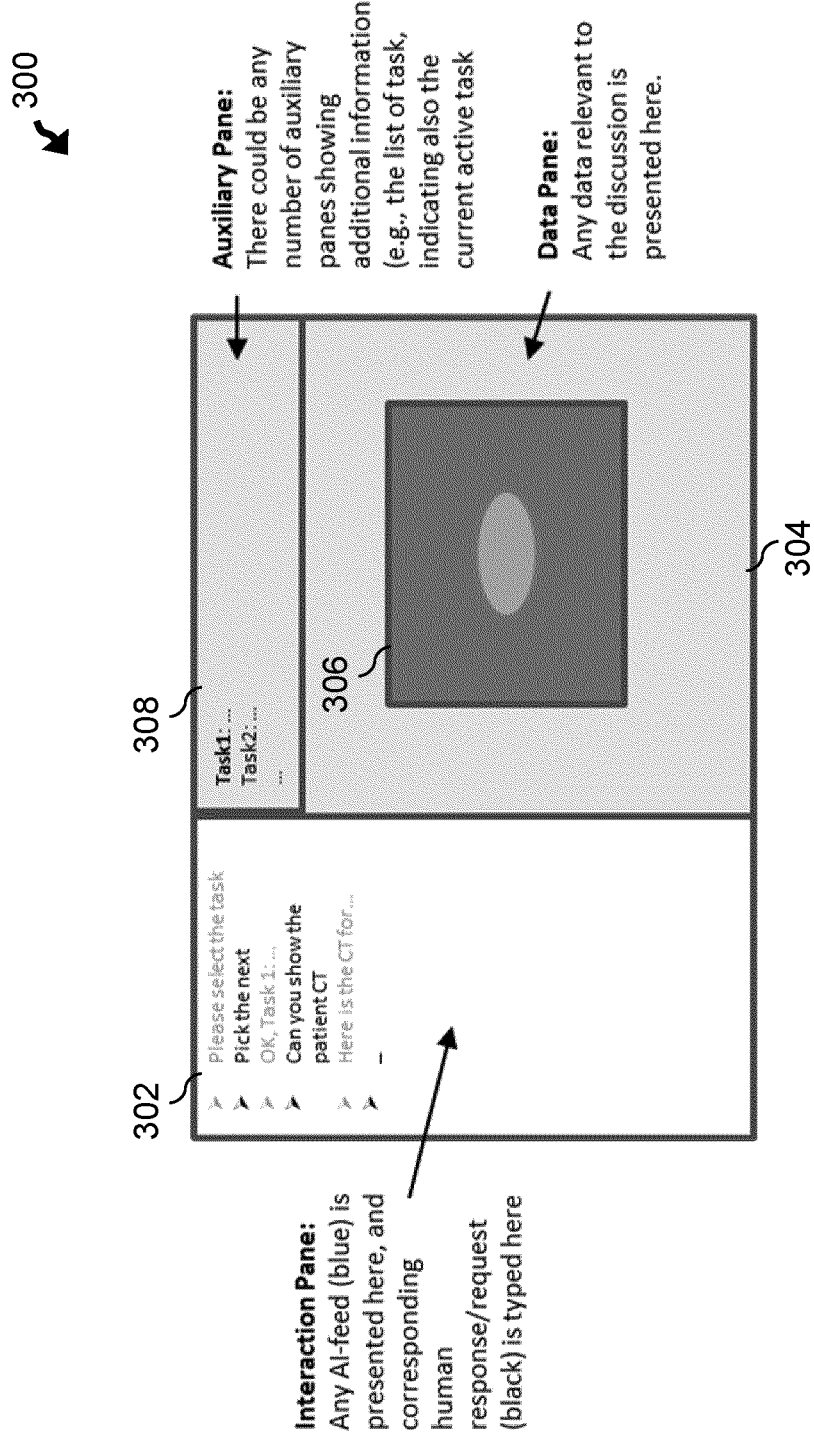
FIG. 3 illustrates an example user interface for facilitating generation of a radiotherapy treatment plan using machine learning language processing, according to an embodiment.

In a non-limiting example, referring now to FIG. 3, the analytics server can generate a user interface 300 to include an interaction interface 302 and a patient data interface 304. The interaction interface 302 can be a portion of the user interface 300 that a user can use to interact with a machine learning language processing model). The user can input text, images, and/or video into the interaction interface 302 and receive responses from the machine learning language processing model in the interaction interface 302. The patient data interface 304 can be an area of the user interface 300 through which the analytics server can present retrieved patient data 306 for a patient. The patient data interface 304 can be configured to present any type of data, such as text, images, or videos. The analytics server can generate the user interface 300 and transmit the user interface to a computing device accessed by a user.

The user interface can include an auxiliary interface 308. The analytics server can include the auxiliary interface 308 on the user interface 300 to illustrate additional information relevant to the conversation on the interaction interface 302 and for the retrieved data on the patient data interface 304 to the user using the user interface 300 to perform. The auxiliary interface 308 can include a list of tasks, such as the current task. The tasks can indicate tasks for the user to complete by communicating with the machine learning language processing model. For example, the user can input an option to select a task to generate a radiotherapy treatment plan for patient A. Responsive to the input, the machine learning language processing model can identify the input and use the input to determine a response to collect patient data regarding patient A. Another example of a task is to show a CT scan for a patient in the patient data interface 304. Responsive to an input identifying such a task, the machine learning language processing model can identify the input, and the analytics server can retrieve the CT scan for the patient and display the patient scan on the patient data interface 304.

Referring again to FIG. 2, at step 204, the analytics server can receive a first input. The analytics server can receive the first input from the interaction interface of the user interface. The first input can include a first patient attribute of a patient. The first input can include the patient attribute and any number of other patient attributes. The first patient attribute and the other patient attributes can be any type of patient attribute, such as, for example, height, gender, weight, treatment options for the patient, treatment attributes (e.g., gantry movements, gantry positions, etc.), treatment objectives, attributes regarding a tumor (e.g., size or shape), images of the patient or tumor, tumor stage, the primary site of treatment, endpoints, whether the tumor has been extended, body mass index, blood pressure, medical history (e.g., previous medical treatments received by the patient), etc.). A user can provide the first input and select a send or submit button on the user interface, for example. The analytics server can receive the first input from the computing device presenting the user interface.

In one example, the user can provide the first input by typing the first patient attribute and any other patient attributes of the first input into the interaction interface. For example, the user can type the current height, age, weight, and blood pressure into the interaction interface. Typing the patient attributes into the interaction interface can cause text to appear on the interaction interface. The user can select a submit button responsive to typing the first input into the interaction interface to submit the first input to the analytics server.

In another example, the user can provide the first input by selecting the first attribute and any other patient attributes from patient data that is presented on the user interface. For example, the user can select an image of a tumor of the patient and/or one or more other patient attributes from the patient data. The user can select an option to move the selected patient attributes into the interaction interface or otherwise drag the selected patient attributes into the interaction interface. Upon moving the selected patient attributes into the interaction interface, the user can select an option to submit or send the selected patient attributes to the analytics server. In some cases, the user can select an option to submit or send the selected patient attributes without moving the selected patient attributes to the interaction interface.

In some cases, the user can provide the first input by typing the one or more patient attributes into the interaction interface and selecting one or more patient attributes from the patient data for the patient displayed on the user interface. The user can type one or more patient attributes into the interaction interface, and select one or more patient attributes from the patient data, and select a submit button to transmit the first input to the analytics server.

Referring again to FIG. 3, in a non-limiting example, the user can provide the first input into the interaction interface 302. The user can do so, for example, by typing the first patient attribute and any number of other patient attributes into the interaction interface 302. In some cases, in addition to or instead of typing the first patient attribute into the interaction interface 302, the user can select the first patient attribute and/or any number of other patient attributes from the patient data interface 304. The user can select a submit button on the user interface 300 or otherwise submit the patient attributes by selecting an input/output button to transmit the first patient attribute and any other patient attributes to the analytics server.

Referring again to FIG. 2, at step 206, the analytics server can execute the machine learning language processing model. The analytics server can execute the machine learning language processing model using the first input (e.g., the first patient attribute of the patient and/or any other patient attributes of the first input) as input into the machine learning language processing model. The machine learning language processing model can generate a response based on the execution. The response can be or include text. The text can be a string of characters or words requesting a second patient attribute of the patient. For example, the response can be a request for the user to provide a location of a tumor on the patient. The machine learning language processing model can generate the response by implementing learned weights and/or parameters on the data of the first input. The response can be a request for any type of patient attribute.

In some cases, the analytics server can include patient data that was stored in memory in the input to the machine learning language processing model with the first input. For example, the analytics server can receive an input identifier (e.g., a name) of the patient from the computing device. The analytics server can query memory based on the identifier to retrieve patient data regarding the patient from memory. The retrieved patient data can include one or more patient attributes of the patient. The analytics server can additionally, in some cases, retrieve treatment protocols that are available to use to treat the patient. The analytics server can identify the one or more patient attributes and/or the treatment protocols retrieved from memory and input the one or more patient attributes and/or the treatment protocols into the machine learning language processing model instead of or in addition to the first input received from the user interface. The machine learning language processing model can determine the response based on the first input (e.g., the first patient attribute and any other patient attributes) and the retrieved patient data.

The machine learning language processing model can use one or more templates to determine the response to the first input. In some cases, one or more of the templates can include a list of types of patient attributes. The patient attributes can include data or characteristics for the patient and/or methods of treatment (e.g., one template can correspond to one method of treatment and another template can correspond to another method of treatment). The machine learning language processing model can compare the patient attribute or patient attributes of the first input and, in some cases, any retrieved stored data regarding the patient or available treatment protocols, from memory with the patient attribute or patient attributes and/or ways of treatment of the templates. Based on the comparison, the machine learning language processing model can determine that one or more patient attributes are required to determine a radiotherapy treatment plan for the patient based on a template containing required patient attributes that were not included in the first input or retrieved from memory. The machine learning language processing model can identify the missing patient attributes (e.g., the types of the missing patient attributes) and generate a text response indicating for the user to input one or all of the missing patient attributes.

The templates can correspond to one or more template conditions. The template conditions can be rules that, upon being satisfied, indicate that the template is satisfied and that there is enough data to generate a radiotherapy treatment plan for a patient. In one example, a template condition for a template can indicate that the template is satisfied responsive to the machine learning language processing model receiving data for the patient of each patient attribute type of the template as input. In another example, a template can correspond to one or more template conditions that each indicate a different set of specific patient attributes. One of such template conditions can be satisfied responsive to the machine learning language processing model receiving data for the patient for each patient attribute type of the template condition.

In one non-limiting example, a template can include a list of patient attribute types that includes a gender, a height range, a tumor size, a tumor location, and chemotherapy treatment availability. The template can include a condition that indicates that the machine learning language processing model must receive data for each of the patient attribute types on the list for the condition to be satisfied. The template can include a condition that indicates that the machine learning language processing model must receive data for gender, height range, and the radiotherapy treatment availability for the condition to be satisfied. The template can include conditions that are satisfied based on any permutation or combination of the patient attribute types on the list.

In some cases, the templates can correspond to specific patient attributes. For example, instead of or in addition to having a list of patient attribute types, a template can include a list of specific patient attributes. An example of a list of specific patient attributes is as follows: male, a tumor on the stomach, the patient has a tumor with a five-inch diameter. Lists of specific patient attributes can include any patient attributes and any number of patient attributes. Templates with a list of specific patient attributes instead of a list of patient attribute types can include conditions similar to the conditions described above except the conditions are satisfied based on whether the machine learning language processing model includes the specific patient attributes of the conditions instead of the patient types of the conditions.

In some cases, the templates can correspond to both specific patient attributes and patient attribute types. For example, a template can include both a list of specific patient attributes and a list of patient attribute types. Templates with both a list of specific patient attributes and a list of patient attribute types can include one or more conditions similar to the conditions described above except the conditions can be satisfied based on whether the machine learning language processing model includes both specific patient attributes and patient attribute types.

The machine learning language processing model can receive the first input and retrieve one or more templates from memory. The machine learning language processing model can compare the patient attributes of the first input to the one or more templates. Based on the comparison, the machine learning language processing model can identify one or more patient attributes or types of patient attributes (e.g., a first type of patient attribute) of a template that is missing from the first input and that would satisfy a condition if a value of the one or more patient attributes or types of patient attributes were to be in the first input and/or the retrieved patient data for the patient. The machine learning language processing model can generate a response with a question or command for the user accessing the interaction interface to input a value for the requested one or more missing patient attributes.

The analytics server can generate or train the machine learning language processing model. The analytics server can generate or train the machine learning language processing model using supervised learning, unsupervised learning, or semi-supervised learning techniques. For example, the analytics server can train the machine learning language processing model using a labeled training data set. The labeled training data set may include different sentences or paragraphs of text that correspond to the radiotherapy treatment of patients. The sentences or paragraphs of text may correspond to the radiotherapy treatment of patients, for example, because the sentences or paragraphs can include values of one or more patient attributes, and may include specific keywords that correspond to radiotherapy treatment (e.g., radiotherapy, radiation, radiation therapy, oncology, tumor, radiation oncology, linear accelerator, radiation dose, external beam radiation, etc.), etc. In some cases, the labeled training data set can correspond to radiotherapy based on the source of the training data. For example, the labeled training data set can include sentences or text from clinical guidelines for radiotherapy treatment planning, case studies of radiotherapy treatment, medical journals and research papers on radiation therapy treatment, structured radiotherapy treatment plans, etc. The labeled training data set can include annotations indicating the rationale behind certain decisions in the treatment plans or any specific considerations that were taken into account. The labeled training data set can additionally or instead include labels indicating the correct responses to the different sentences or text. The analytics server can automatically label the training data set, or a human reviewer can label the training data set. Such text can be fed (e.g., by the analytics server) into the machine learning language processing model for training.

The analytics server can train the machine learning language processing model using backpropagation techniques. For example, the analytics server can insert different entries (e.g., prompts, such as sentences or text) in the training data set into the machine learning language processing model and execute the machine learning language processing model for each entry. In executing the model for an entry, the machine learning language processing model can generate or output a word or a sequence of words based on the words, images, and/or videos in the entry. The analytics server can determine a difference between the output of the machine learning language processing model and the label for the entry according to a loss function. The analytics server can use backpropagation techniques based on the difference to adjust the parameters and/or weights of the machine learning language processing model. The analytics server can train the machine learning language processing model in this manner over time with different labeled entries. The analytics server can train the machine learning language processing model until the machine learning language processing model is accurate to an accuracy threshold, at which point the analytics server can deploy the machine learning language processing model for use to collect patient attributes through the interaction interface.

During training, the analytics server may iteratively execute the machine learning language processing model to generate new predicted text, images, and/or videos based on the training dataset (e.g., for each entry of text, images, and/or videos). If the predicted results do not match the real outcome, the analytics server can continue the training unless and until the computer-generated recommendation satisfies one or more accuracy thresholds and is within an acceptable range. For instance, the analytics server may segment the training dataset into three groups (i.e., training, validation, and testing). The analytics server may train the machine learning language processing model based on the first group (training). The analytics server may then execute the (at least partially) trained machine learning language processing model to predict results for the second group of data (validation). The analytics server then verifies whether the prediction is correct. Using the above-described method, the analytics server may evaluate whether the machine learning language processing model is properly trained. The analytics server may continuously train and improve the machine learning language processing model using this method. The analytics server may then gauge the machine learning language processing model's accuracy (e.g., the area under the curve, precision, and recall) using the remaining data points within the training dataset (test).

At step 208, the analytics server can present the response. The response can be text requesting the second patient attribute of the patient. The second patient attribute that the machine learning language processing model determined would cause the data for the patient to satisfy a template condition of a template. The analytics server can present the response requesting the second patient attribute of the patient at the interaction interface being accessed by the user.

Referring again to FIG. 3, in a non-limiting example, the analytics server can present the response on the user interface 300. The response can be a request for a current body mass index of the patient. The analytics server can present the response at the interaction interface 302 of the user interface 300. The analytics server can present the response underneath the first input the user initially provided through the interaction interface 302.

Referring again to FIG. 2, at step 210, the analytics server can receive a second input from the user interface. The second input can include a value of the second patient attribute requested in the response presented at the interaction interface. The user accessing the user interface can input the value (e.g., via text, an image, or a video) of the second attribute into the interaction interface. The response presented at the interaction interface can be text requesting the second patient attribute of the patient. The computing device presenting the user interface can transmit the value of the second patient attribute to the analytics server. The analytics server can receive the value as the second input.

The analytics server can receive the second input. The analytics server can execute the machine learning language processing model using the second input, the first input, and/or any retrieved patient data from memory to determine if any template conditions are satisfied. Responsive to determining there are not any satisfied template conditions, the machine learning language processing model can generate a request for another patient attribute (e.g., a third patient attribute). The analytics server can transmit the request for the third patient attribute to the computing device for display on a user interface. The user accessing the user interface can input a value for the third patient attribute and the computing device can transmit the value for the third patient attribute to the analytics server. The analytics server and the computing device presenting the user interface can repeat this process until the machine learning language processing model has received patient attributes to satisfy a plan condition.

A plan condition can be or include one or more rules that, upon satisfaction, indicate enough data or patient attributes have been collected to generate a radiotherapy treatment plan for a patient. A plan condition can be or include a template condition or any other set of rules.

Referring again to FIG. 3, in a non-limiting example, the analytics server can receive the second input containing the second patient attribute from the user interface 300. The user accessing the user interface 300 can input a value for the second patient attribute into the interaction interface 302. The second patient attribute can be, for example, potential treatment options for the patient. The user can input the value for the second patient attribute and values for any other patient attributes as a second input and select a submit button. The selection of the submit button can cause the computing device presenting the user interface 300 to transmit the second input to the analytics server.

Responsive to determining (e.g., via the machine learning language processing model) that the analytics server has received patient attributes to satisfy a plan condition (e.g., determining that at least the first and second patient attribute satisfy a template condition), at step 212, the analytics server can transmit the first patient attribute of the patient and the second patient attribute of the patient to a radiotherapy plan optimizer. The radiotherapy plan optimizer can be a computer model (e.g., an optimization computer model) that is configured to generate one or more treatment attributes for a radiotherapy treatment plan that comply with the radiation therapy plan objectives for a patient (e.g., objectives in patient attributes of the patient) based on patient attributes of the patient for which the radiotherapy treatment plan is being generated. The radiotherapy plan optimizer can generate the one or more treatment attributes, for example, by iteratively calculating the one or more treatment attributes where, with each iteration, the radiotherapy plan optimizer revises the one or more attributes of the radiotherapy treatment plan in accordance with a cost value. The radiotherapy plan optimizer can receive the first patient attribute of the patient and the second patient attribute of the patient, in some cases in combination with other patient attributes that were used to satisfy a template or plan condition. Based on the patient attributes, the radiotherapy plan optimizer can generate or determine one or more attributes (e.g., radiation dose amounts or other information, field geometry settings, arc settings, treatment frequency, type of treatment, radiation parameters, etc.) of a radiotherapy treatment plan for the patient to generate a radiotherapy treatment plan.

The analytics server can generate a vector of tokens from the patient attributes. The analytics server can generate the vector of tokens using a tokenization algorithm, such as WordPiece or Byte Pair Encoding. In some cases, the analytics server can use the same tokenization algorithm that was used to train the radiotherapy plan optimizer to generate treatment attributes of a radiotherapy treatment plan. In generating the tokens, the analytics server can generate an array or vector of numbers from the patient attributes. In some cases, each attribute may correspond to a different number (e.g., map to a different number) and the analytics server can determine a number or token for each attribute based on the mappings. The analytics server can generate the vector of tokens from the patient attributes and transmit the vector of tokens to the radiotherapy plan optimizer.

In some cases, the analytics server can convert the vector of tokens to a structured data set. The structured dataset may include the data in the vector of tokens in a format that the radiotherapy plan optimizer can process. For example, the analytics server can convert the vector of tokens to a traditional structured cost function or field geometry definitions. For example, the analytics server can store a mapping of tokens to values of a cost function or field geometry settings. The analytics server can convert the vector of tokens to the traditional structure cost function or field geometry definitions based on the mapping. The analytics server can transmit the converted vector of tokens to the radiotherapy plan optimizer. In another example, the vector of tokens can contain a reference to one or more pre-defined treatment protocols (e.g., treatment protocol templates). Such tokens can be used to construct instructions to the radiotherapy plan optimizer. For example, in some cases, the token may instruct the plan optimizer to exclude and/or include certain treatment attributes from the radiotherapy treatment plan.

The radiotherapy plan optimizer can receive the patient attributes (e.g., the raw patient attributes, the vector of tokens representing the patient attributes, or the converted vector of tokens, as described above). A computer (e.g., the analytics server or another computer) storing the radiotherapy plan optimizer can execute the radiotherapy plan optimizer using the patient attributes as input. The radiotherapy plan optimizer can output one or more treatment attributes of a radiotherapy treatment plan for the patient based on the patient's attributes. The radiotherapy plan optimizer can transmit the one or more treatment attributes to the analytics server.

The analytics server can receive the one or more treatment attributes. The analytics server can present the radiotherapy treatment plan (e.g., the one or more treatment attributes of the radiotherapy treatment plan) on the user interface. The analytics server can present the radiotherapy treatment plan on the interaction interface of the user interface or on another portion of the user interface. In some embodiments, the analytics server can transmit the one or more treatment attributes to a radiotherapy treatment machine to use to provide treatment to the patient. The radiotherapy treatment machine can operate (e.g., automatically operate) based on the one or more treatment attributes.

In some cases, the user at the user interface may adjust the radiotherapy treatment plan. For example, the user viewing the radiotherapy treatment plan at the user interface can provide an input (e.g., a text input or a selection of a button) at the user interface that the radiotherapy treatment plan is incorrect. The analytics server can receive the input indicating the radiotherapy treatment plan is incorrect. Responsive to the input indicating the radiotherapy treatment plan is incorrect, the analytics server can execute the machine learning language processing model using the input or an indication of the input that the radiotherapy treatment plan is incorrect to generate a second response requesting a third patient attribute or a fourth patient attribute regarding the patient. The analytics server can present the second response requesting the third patient attribute or the fourth patient attribute of the patient at the interaction interface. The analytics server can receive, from the interaction interface, a third input comprising the requested third patient attribute or the fourth patient attribute of the patient. The analytics server can transmit the first patient attribute of the patient, the second patient attribute of the patient, and the third patient attribute or the fourth patient attribute of the patient to the radiotherapy plan optimizer (e.g., a vector of tokens or a converted vector of tokens generated based on the patient attributes). The radiotherapy plan optimizer can generate a second radiotherapy treatment plan for the patient based on the first patient attribute, the second patient attribute, and the third patient attribute or the fourth patient attribute. The radiotherapy plan optimizer can transmit the second radiotherapy treatment plan to the analytics server. The analytics server can present the second radiotherapy treatment plan at the user interface and/or transmit the second radiotherapy treatment plan to the radiotherapy machine.

Figure 4:
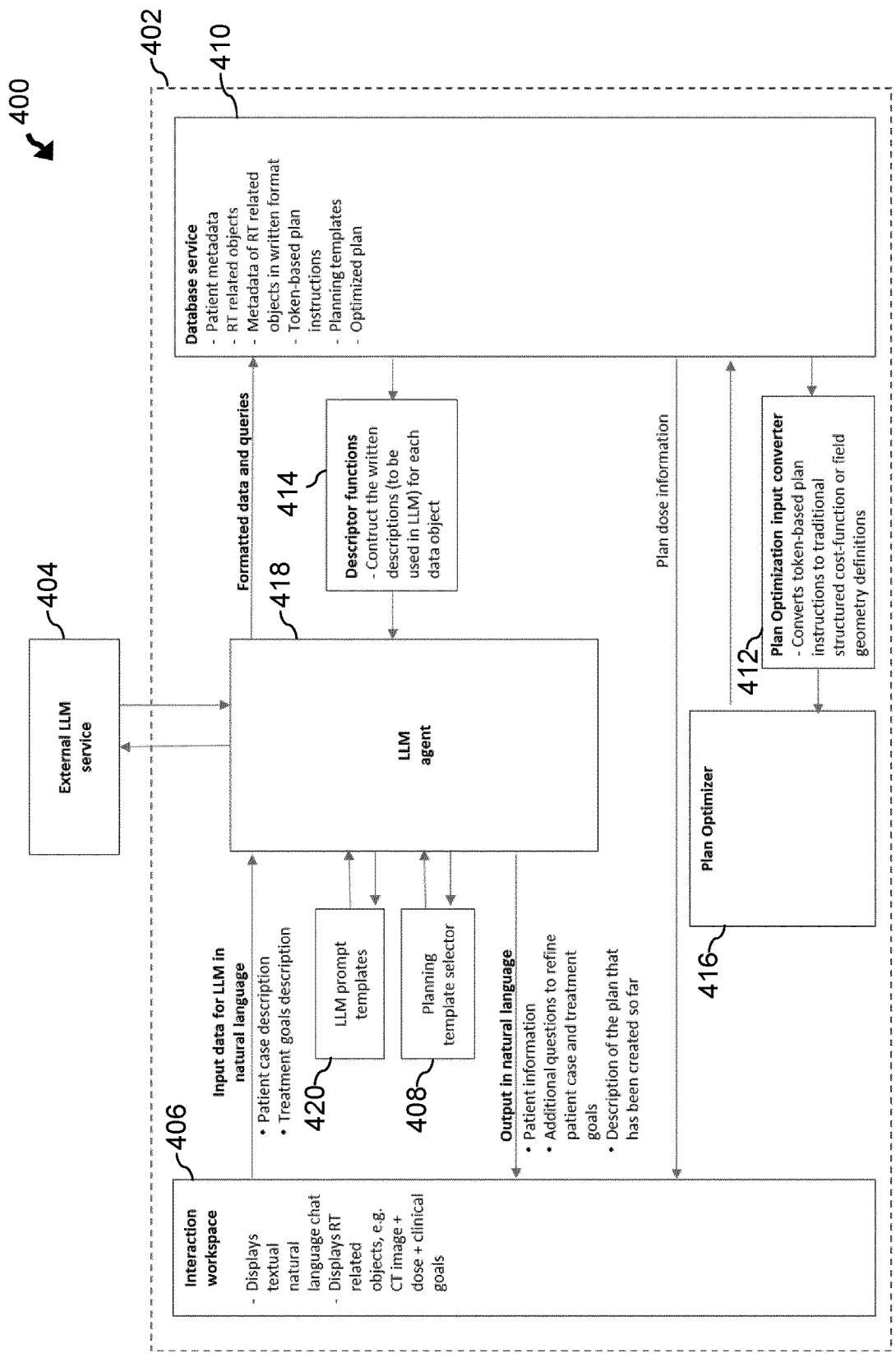
FIG. 4 illustrates a data flow within a machine learning language processing plan generation system, according to an embodiment.

FIG. 4 illustrates a data flow within a machine learning language processing plan generation system 400, according to an embodiment. The system 400 may include an analytics server 402 and a language learning model (LLM) service 404. The LLM service 404 can be stored locally in memory of the analytics server 402 or the LLM service 404 can be stored remotely at another computing device. The LLM service 404 can be or include a machine learning language processing model configured to generate and output text, image, or video responses to input text, image, or video, as described herein. The analytics server 402 can include a workspace generator 406, a planning template selector 408, a database service 410, a plan optimization input converter 412, descriptor functions 414, a plan optimizer 416, and an LLM agent 418. The components 402-418 can operate together to generate a radiotherapy treatment plan using machine learning language processing techniques. The LLM agent 418 can be a program, such as an application programming interface, that is configured to communicate or otherwise send messages to the LLM service 404 and/or receive messages from the LLM service 404. In doing so, the LLM agent 418 can provide inputs to the machine learning language processing model and receive outputs from the machine learning language processing model.

Any of the components 402-418 can be supported by pre-defined prompt templates 420 which can process language information into a 'grammatically more strict' serialized token list. Prompt templates 420 can be or include LLM prompt templates. Prompt templates 420 can be configured to make choices or identify identification strings for database retrieval. Prompt templates 420 can embed a language description or a grammatically stricter description into a request instructing a machine learning language processing model to provide a specific type of output. For example, a template can create a feature vector from patient attributes and any other text input at a user interface and/or retrieved from memory that a machine learning language processing model can be configured to process and provide a response to. In turn, such a machine learning language processing model can be configured to output a response in the instructed format (e.g., text, images, video, etc.), which may or may not be serialized (e.g., a serialized list of requested patient attributes).

The workspace generator 406 can generate a user interface for a user (e.g., an oncologist or other clinician). In one example, the workspace generator 406 can generate the user interface 300 or generate a user interface similar to the user interface 300. The workspace generator 406 can be configured to generate and present a user interface component or widget for presenting a language feed that can be used for the language communication between the user and the LLM service 404. The workspace generator 406 can generate a user interface in which radiotherapy-related objects can be presented or visualized on the user interface. Examples of such objects can include a radiotherapy planning template, patient data (a CT image, structure sets, etc.), plan data (e.g., dose distribution, the status of selected clinical goals, etc.), etc. Radiotherapy-related objects can be patient attributes for individual patients. The workspace generator 406 can present such user interface components on a user interface being used to communicate with the analytics server 402.

The workspace generator 406 can generate the user interface to include at least an interaction pane (e.g., the interaction interface 302) that can present a textual feed from responses from the LLM service 404 and other components. A user of the workspace generator 406 can type in user responses to the presented responses from the LLM service 404. In some cases, the communication can be done using a separate speech recognition tool and a separate speech-producing tool.

The workspace generator 406 can include a data pane (e.g., the patient data interface 304) to present other clinical data on the user interface. Such clinical data can be image data (e.g., CT images, structure sets, plan field geometry, or plan dosage), or it can be presented as forms or tables (e.g., a list of possible choices, templated planning instructions, how clinical goals have been met, etc.). The interaction pane and the data pane can interact with each other. For example, the workspace generator 406 can load components of data from the interaction pane to the data pane, or a selection of a data element in the data pane can create a corresponding token for the selected data element in the interaction pane.

The workspace generator 406 can include one or more auxiliary panes in the user interface. The one or more auxiliary panes can provide additional information, such as the list of tasks assigned to the user, indications of the active task(s), and/or any state information related to active tasks. For example, if a task requires filling out a form or selecting a template, the auxiliary pane can include current choices for the form content or template.

The workspace generator 406 can generate the user interface such that the user does not need to leave the interaction pane during a standard planning session and can view relevant information for the planning session that is presented on the user interface. In some cases, the user interface can include user interface controls (e.g., buttons) that can invoke different tasks, such as starting a planning session for a new patient. In some cases, a task can be instantiated or launched through a request in the interaction pane of the user interface. When a task is requested through the interaction page, a special prompt can be required to process the request and search if a new task is to be launched.

The database service 410 can allow for the retrieval of radiotherapy-related objects (e.g., patient attributes) based on identification strings or keywords. The database service 410 can differ from existing database services because the database service 410 can store descriptions written in language for each of the radiotherapy objects. These descriptions can facilitate LLM service 404 responses (e.g., queries) by providing additional context for the objects in the feed which can be processed by the LLM service 404. Part of a written description can be a serialized string of tokens following stricter 'grammatical rules' than the language (such as JSON or some key-value pairs) which can also be processed by more traditional algorithms—such as a plan optimizer as described below.

The database service 410 can store written descriptions associated with different data objects. The database service 410 can write algorithmically generated serialized descriptions (which can be created using descriptor functions 414, as described below). Additionally or instead, the database service 410 can store previous discussions (or summaries of such discussions) which have been recorded from a user's interactions with the user interface generated by the workspace generator 406. The conversational description can be added as an optional element to prompts or inputs into the machine learning language processing model to get more contextual information for responses (e.g., to create the appearance that the machine learning language processing 'remembers' a previous discussion). For patient-related data objects (e.g., patient attributes), the scope of the stored discussions can be related to the planning sessions of that particular patient (e.g., discussion stored to a particular plan is recorded from the corresponding planning sessions). For more generic data-objects (e.g., for planning templates), stored discussion summaries can contain comments collected from a larger set of tasks (e.g., the database service 410 can store user or clinician-specific preferences for a certain planning template). Such preferences can be collected from remarks (e.g., inputs into the interaction pane that the user provided during several planning tasks).

The descriptor functions 414 can be a set of instructions that, upon execution by the analytics server, can construct written descriptions for different data objects. The descriptor functions 414 can construct the written description for patient attribute data objects such as, for example, patient data (e.g., a CT image or a structure set) and treatment attributes (e.g., dose distribution). The written descriptions may or may not be in a language. For example, the written descriptions can be or include a serialized list of tokens that describe the details so the machine learning language processing model can consume the information.

The descriptor functions 414 can be used in a conversational treatment planning system as described herein. The descriptor functions 414 can convert radiotherapy objects into a serialized description, for example. The descriptor functions 414 can be or include traditional algorithms or the descriptor functions 414 can be based on generative machine learning models trained to generate serialized descriptions. The descriptor functions 414 can be configured to generate written descriptions of data with various formats (e.g., three-dimensional images) which can be added to the input to the machine learning language processing model. The descriptor functions 414 can enable a user to input images into the interaction pane to provide data to the machine learning language processing model to generate a radiotherapy treatment plan for a patient. In some cases, the prompt templates 420 can be used to generate the input into the machine learning language processing model. The prompt templates 420 can contain instructions to create an output in the format which would be similar to or the same as the output of the descriptor functions 414 (e.g., if the descriptor functions 414 output text, the input into the machine learning language processing model can contain instructions to output text).

In one example, a descriptor function 414 can be or include a patient descriptor function. The patient descriptor function can be configured to receive patient information such as a CT image (or other imaging modality) and structure set information (e.g., a delineation of organs-at-risk (OARs) and target structures). The patient descriptor function can output a list of statements describing the geometry of the patient based on the input. For example, the patient descriptor function can output a list of statements such as the following:

---
"Treatment Site": "HEAD_NECK"}
"GTV_location": "oropharyngeal"
"CTV_overlap": "oral_cavity"
"CTV_low_volume": "320cc"
"CTV_low_proximity": "parotid gland left"
---

The patient descriptor function can create such statements using templates. In one example, the templates can be configured to systematically test the overlaps between target structures and various OARs. In another example, the templates can be configured to calculate distances between the structures.

In some cases, part of the statements can be created using supervised learning models (e.g., an ad-hoc supervised learning model). The supervised learning models can be trained to give certain labels to the CT or structure set data. For example, the supervised learning models can be trained to recognize the location of gross tumor volume (GTV) or to generate a general statement of whether a case is unilateral or bilateral.

In some cases, the statements can be generated using a generic generative machine learning model that has been trained to produce free-form descriptions for a given image. In such cases, a machine learning language processing model can be used (e.g., together with a prompt generator that generates a prompt for the machine learning language processing model using a prompt template) to convert the free-form description into a list of statements.

In some embodiments, a patient descriptor can receive a treatment planning template as input. The patient description can use the treatment planning template to give statements related to predicted dose distributions (e.g., producing a predicted dose) and add statements such as '{"Predicted_goal_violation": "(parotid gland left, mean_dose, <30 Gy)" }'.

In another example, a descriptor function 414 can be or include a plan descriptor function. The plan descriptor function can be configured to receive as input a created plan together with planning instructions (e.g., minimum requirements for the plan) and evaluate a plan relative to the planning instructions. The plan descriptor function can be or include a traditional algorithm that evaluates how different planning goals (e.g., either explicitly stated or implicitly added, such as some normal tissue objectives) are met or violated. As an example, a constructed list of statements that the plan descriptor function can output can be or include {"Goal_met": "(PTV_high, dose_coverage_at_prescription_level, >95%)"}
  {"Acceptable_variation_met": "(Spinal_cord, dose_max, <42Gy)"}
    {"Goal_violation": "(Lung Ipsi, D_5cc, <7Gy)"}
  {"Prediction_violation": "(Lung Contra, mean_dose, 10%)"}.

The list of statements can contain spatially restricted observations, such as '{"Regional_Prediction_violation": "(region_proximal_to_spine, 10%)" }'. In some cases, a generative model can be trained to create such statements as free-form descriptions.

The plan optimizer 416 can be configured to create plan optimization instructions (e.g., cost function generation or field geometry settings) based on patient attributes or a vector of tokens that was generated based on patient attributes. The plan optimizer 416 can be configured to receive a structured cost function or field geometry definitions from the plan optimization input converter 412 and generate treatment attributes of a radiotherapy treatment plan based on the structured cost function or field geometry definitions.

The plan optimizer 416 can be configured to receive serialized planning input information as input in addition to patient geometry information (e.g., and beam data information). The plan optimizer 416 can operate in a pre-processing step in which a list of statements generated is converted to a cost function and, in some cases, field geometry information. The list of statements can contain an element describing which planning template to use to generate a radiotherapy treatment plan. In an embodiment, the list of statements can include a planning template as a first statement and then every consecutive statement subsequent to the planning template can be a modification to the planning template. The plan optimizer 416 can process the modifications in the order of the list of statements. For example, serialized planning instructions can be input into the plan optimizer 416 in the following type of list of statements:

{"Use_template": "Prostate_low risk_hypofractionation_VMAT"}
  Increase_priority": "Femural Head left"}
    {"lower_priority": "Bladder"}
  {"Abandon_goal": "Meet_predicted_dose"}
    {"Add_goal": "(Max_MU, <2000)"

The plan optimizer 416 can generate one or more treatment attributes for a radiotherapy treatment plan based on the list of statements. The plan optimizer 416 in combination with a plan descriptor function can form an optimization system that takes as input a feed (e.g., inputs from the interaction pane of the user interface generated by the workspace generator 406) and returns as output a feed (e.g., a radiotherapy treatment plan including treatment attributes such as a radiation dose matrix). The feed can be embedded into the conversational plan creation process (e.g., displayed on the interaction pane generated by the workspace generator 406). In some cases, the planning template can be split into sub-templates. In such cases, the list of statements can have separate references for the different templates (e.g., there can be a separate template for clinical goals and non-clinical goals (e.g., a max monitor unit (MU)), field geometry can be specified with a different template, there can be an additional set of goals to be used in case of replanning in different templates, etc.

The planning template selector 408 can be configured to select the most relevant treatment planning template based on the language description. For example, once a user has described a planning task, one or more prompts can be used to determine which treatment planning template is best suited for performing the planning task and to cover possible sub-tasks related to the template selection, such as filling forms. The planning template selector 408 can do so by accessing a database of defined templates, where a language description is attached to each template. A prompt template can be used to embed the user's description, the serialized patient description, as well as the planning template description, to create a request to a machine learning language processing model to indicate how relevant the current template is for an oncologist or other user's description and the serialized patient description. After such analyses is performed for each of the plans, another prompt template 420 can be used to create a query (e.g., an LLM query) to select the best matching planning template. For efficiency reasons, it can be beneficial to combine traditional filtering to first reject planning templates that are not clearly relevant either before the usage of the first prompt template 420, or after the usage of the prompt template. The filtering can be based on a keyword search, for example.

In a non-limiting example, an oncologist (e.g., a user) can invoke a conversational plan creation session in a user interface generated by the workspace generator 406. The oncologist can do so by selecting a patient or by selecting a planning task from a list of assigned tasks and giving a language description of what (s)he wants to achieve as a result. The database service 410 can fetch patient data (and other data related to the task) for the selected patient. In some cases, a descriptor function 414 can create a language patient description of the anatomy of the patient. The patient description and the oncologist's description of the patient can be combined to generate a prompt (e.g., using a prompt template 420). The prompt can instruct the LLM agent 418 to either request additional information or use the planning template selector 408 to retrieve a template that best matches the case at hand (e.g., includes data most similar to the data of the prompt template 420 compared to other templates).

The oncologist can provide inputs into the user interface over multiple iterations each indicating different patient attributes that can be used to determine a radiotherapy treatment plan for the patient. The interactive process can end when enough information is available to generate a radiotherapy treatment plan for the patient.

The descriptor function 414 can generate serialized planning instructions based on the information for the patient. The serialized planning instructions may not necessarily define anything more than just a planning template. The plan optimizer 416 can generate treatment attributes of a radiotherapy plan. A descriptor function 414 can create a serialized plan description from the treatment attributes output by the plan optimizer 416. The serialized plan description can be input into the machine learning language processing model to convert the serialized plan description into a language radiotherapy treatment plan.

The workspace generator 406 can present the radiotherapy treatment plan at the user interface being accessed by the oncologist. The workspace generator 406 can request feedback for the radiotherapy treatment plan. The radiotherapy treatment plan can be presented to the oncologist and feedback requested. The oncologist can reject the radiotherapy treatment plan and provide a description of what is wrong with the plan and/or what the oncologist would like to change. The description can be wrapped into a prompt and used to create a new set of planning input information (e.g., adding more detailed instructions on top of the previous planning information). The plan optimizer 416 and the descriptor function 414 can generate an updated radiotherapy treatment plan based on the feedback. The workspace generator 406 can output the radiotherapy treatment plan on the user interface. The process can repeat until the oncologist provides input indicating a radiotherapy treatment plan is accepted or does not otherwise reject a radiotherapy treatment plan.

In some cases, an oncologist can input a list of assigned tasks (e.g., a request to do planning for different patients). The tasks can be divided into phases with a clearly defined sub-task that has a specific outcome requiring communication (e.g., selecting the right planning template, filling a form used in template refinement, or determining the next plan variant request). Every user feed can be processed using multiple prompts to determine the proper action.

Figure 5:
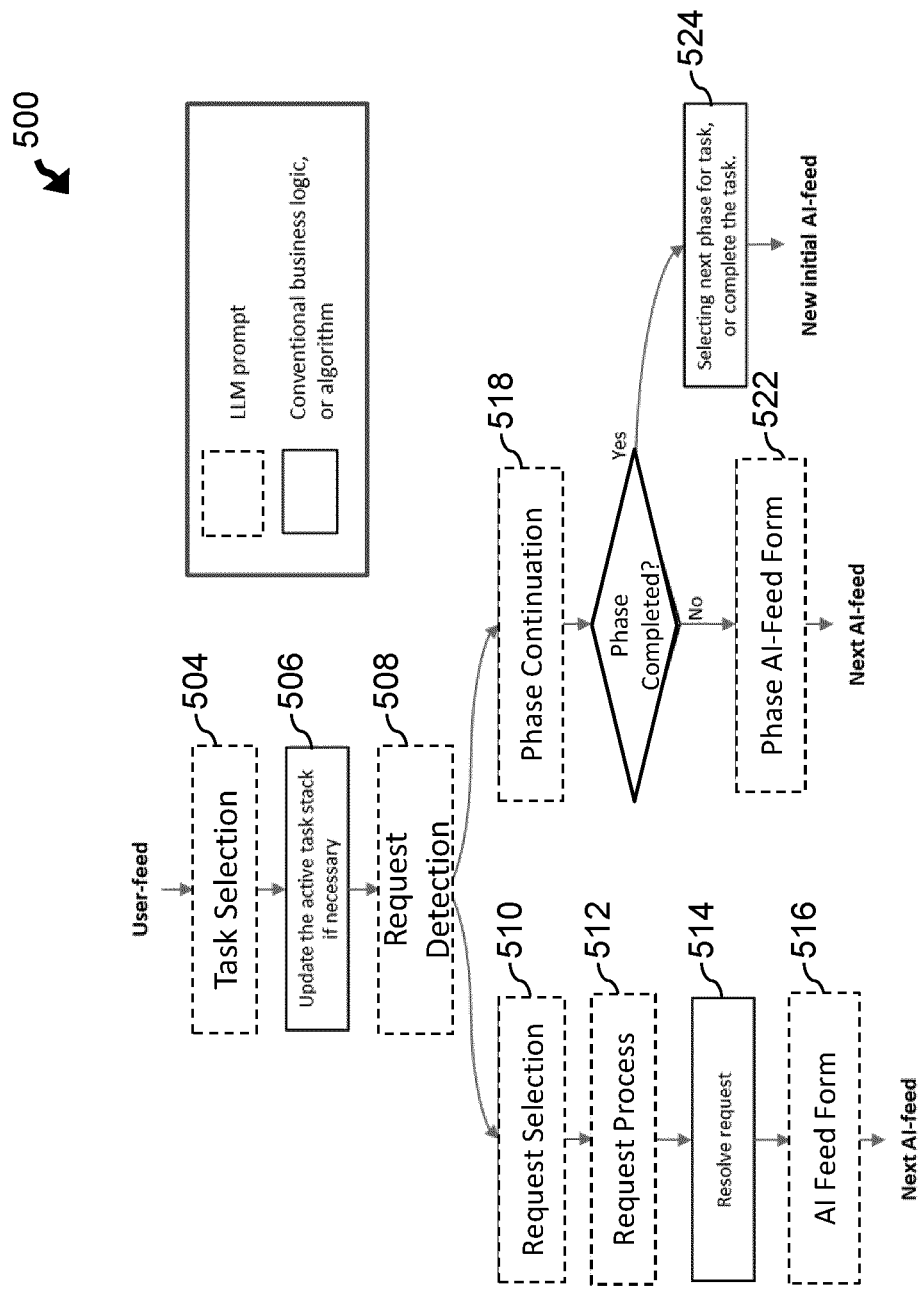
FIG. 5 illustrates a process flow diagram executed in a machine learning language processing plan generation system, according to an embodiment.

FIG. 5 illustrates a process flow diagram executed in a machine learning language processing plan generation system, according to an embodiment. The method 500 may include steps 504-524. However, other embodiments may include additional or alternative steps or may omit one or more steps altogether. The method 500 is described as being executed by a server, such as the analytics server described in FIG. 1. However, one or more steps of the method 500 may be executed by any number of computing devices operating in the distributed computing system described in FIG. 1. For instance, one or more computing devices may locally perform part or all of the steps described in FIG. 5. The analytics server can perform the steps of the method 500 each time a user provides input or initiates a conversation with a machine learning language processing model of the analytics server to generate a radiotherapy treatment plan. The steps 504, 508, 510, 512, 516, 518, and 522 can be performed using an LLM prompt (e.g., an input into a machine learning language processing model). Steps 506, 514, and 524 can be performed using a conventional business logic or algorithm.

At step 504, the analytics server generates a task selection prompt. The task selection prompt can answer a question as to whether an input at the user feed is a continuation of the current topic of the conversation or introducing a new topic (or a return to an old topic). If a topic change is detected, at step 506, the appropriate change to the active topic stack is performed. At step 508, a request detection prompt can be used to evaluate whether the input at the user feed was a direct answer to the latest response by the machine learning language processing model, or whether to process the input as an interruptive request (e.g., a question for additional information or a request to present certain data). If a request was detected, the process will continue to a request processing pipeline in which LLM prompts can be used to first detect the actual request type and then, if necessary, assist in formatting the request into a shape. At step 514, the request can be resolved using traditional business logic or algorithms. After the request has been resolved, at step 516, one or more LLM feeds might be used to present the continuation as the next LLM feed (or the previous LLM feed can be repeated). If instead at step 508 the request detection does not find an interruption request, at step 518, the user feed can next be processed in the phase continuation prompt with the intention to process the input at the user feed as a continuation to the current active discussion. The outcome of the phase continuation step 518 can be that the user needs to provide more information before the phase can be completed at step 522, in which case it is possible that one more LLM feed is used to create the next LLM feed (e.g., the next response by a machine learning language processing model) or the next LLM feed can be generated as part of the previous phase continuation LLM prompt. Alternatively, the phase completion can be detected and, at step 524, the task-related business logic can be used to determine the next phase or task.

The steps of the method 500 can be performed in any order and/or be combined into any combination. For example, the request detection step 508 and the request selection step 510 can be combined, the task selection step 504 can be omitted, etc.

As described herein, a task can include one or more atomic phases. Each phase can include the following information: (1) task/phase specific information known at the beginning of the task/phase, such as the referred patient information; (2) a task/phase completion condition (e.g., a form that needs to be filled or a selection that needs to be made before the system can proceed to the next phase or to complete the entire task); (3) a phase-continuation LLM prompt template. The phase-continuation LLM prompt template can be template text that includes language that can be used to embed certain user input to an LLM input feed that provides more context in order to control the LLM output. An example phase continuation LLM prompt template is as follows:

"Your task is to answer the following question as well as possible.
Give the answer in the following format:
Question: the question to be answered
Answer: your detailed answer
When forming your answer, consider also the following information:
{context Info}
Question:{question}
Answer:"

where {context info} and {question} are the variable data that can be filled to the prompt. This template is a non-limiting illustrative example; (4) any additional traditional business logic that is used to process the user feed and act in a way that the phase completion is eventually accomplished. Such logic can contain: (i) a matching pattern to retrieve a particularly interesting or relevant part of the answer which is typically at the beginning of the output feed, but in certain situations, it is important to take only a certain part of the output and use that in the later stage; and/or (ii) a decision-making pattern, such as a traditional function that converts a certain matched output to an action. These actions can be or include, for example:

invoking another LLM Powered task,
    invoking new LLM query with augmented input feed,
    waiting for additional information from the user,
    invoke a non-LLM task such as planning, or replanning,
    present certain data in the data pane,
    initiate new planning task, or end current planning task,
       invoke any associated database calls; and (5) in some cases, LLM prompts can contain task/phase-specific components. For example, a request selection prompt may consider certain requests only if a particular phase is active. For example, a request to show a dose is only valid if the task or phase is such that at least one radiotherapy treatment plan is available.

A computer can iteratively perform the method 500 by performing the following tasks:

When the state of the computer is waiting (e.g., in standby in which there are no active tasks), any user-given instructions can invoke a general-purpose LLM task to determine what is actually the most proper action. In the waiting state, the computer can support activities other than plan creation;

When the computer determines that a user-given instruction is a request to start a new planning session, the same instruction set is given as input to an LLM to determine when a plan template selection can be started. The LLM can perform an iterative decision-making process to either ask more questions from the user or collect the information and invoke a plan template selection. In some cases, another LLM can be called to generate a serialized patient description, such as by retrieving the serialized patient description from a database or by using a patient descriptor function;

The computer can select a plan template for a radiotherapy treatment plan;

After selecting the plan template, the computer can begin the plan creation phase, such as by using an LLM query to prepare the required input for a plan optimizer. Once the computer determines an optimal plan, the computer can present the radiotherapy treatment plan to the user (e.g., the oncologist);

In some cases, the user can select an option to reject the radiotherapy treatment plan. Upon doing so, the user can input further data regarding the treatment and/or the patient. The computer can provide the input to the machine learning language processing model to repeat the plan generation process with the plan optimizer.

There can be an auxiliary task (e.g., either an LLM task or a non-LLM task) that supports the interaction. For example, every time a part of an LLM output is provided to the user, a special LLM prompt or non-LLM algorithm can be invoked to determine whether to provide data in the data pane.

The described planning/re-planning task can be a part of a bigger system of more supported tasks. In such a case, every user-given input can first go through a specialized LLM task to determine whether to continue the current task or abandon the task and move on to a new task.

In some cases, a specialized LLM prompt can be used to detect if any part of the user feed contains general comments to be stored for the future and then to be added to the phase-continuation LLM prompts in similar tasks in the future.

Overall, a computer implementing the systems and methods described herein can store and provide for use customized LLM-powered tasks for use in radiotherapy planning. The computer can use LLM-powered queries for radiotherapy planning. For example, the computer can use LLM-powered queries that include an LLM prompt template which can be used to construct an LLM query input feed, a pattern-matching algorithm allowing retrieval of a particular part of the LLM query output feed, and/or a decision-making pattern indicating an imminent reaction to the specific part of the LLM query output, which can include a possible re-query with an augmented LLM input feed.

Examples of LLM queries can include a query to detect if a user-given language feed should initiate a new planning task, a query to detect when a planning problem is described well enough that a planning template selection can be started, a query to select a planning template that fits best to given language description, a query to convert the given language planning instructions into a grammatically restricted list of tokens, a query to present the automatically generated grammatically restricted list of tokens describing a plan in a user-friendly format, a query to detect when a re-planning problem is described well enough that replanning can be started, and a query to convert a re-planning description into planning instructions using a grammatically restricted list of tokens. The computer can organize different queries into pre-defined pipelines so a single user feed can be processed in stages.

The computer can provide a user interface that is designed to support a conversational interaction with the machine learning language processing model. The user interface can include a data pane that presents relevant (e.g., non-natural language) data such as CT images, structure delineations, or plan-related information such as field geometries, dose distributions, and a table of clinical goals. The computer can control, in language, the data that is presented in the data pane on the user interface and which tokens to present in an interactive pane of the user interface (e.g., an identification string for a selection made in some embedded selection dialog, a combo-box, etc.).

The computer can store a database in memory that stores a language description that is mapped to radiotherapy data (e.g., non-serialized radiotherapy data). These descriptions can be, for example, language text indicating any previous 'conversations' related to particular RT data objects, a grammatically restricted list of statements, etc. The descriptions can be programmatically created from the associated radiotherapy data object.

The computer can store and execute descriptor functions that can provide serialized textual (e.g., in language text) descriptions for a certain type of radiotherapy data, such as for patient and plan data. A patient data descriptor function can be configured to generate a description based on a selected treatment planning template, for example, by analyzing the result of a dose prediction model).

The computer can store and execute an optimizer that is configured to generate a radiotherapy treatment plan (e.g., generate treatment attributes of a radiotherapy treatment plan) based on a serialized textual description. The optimizer can generate such a radiotherapy treatment plan using a pre-formatted list of statements (or a similar list of tokens that can be parsed using a pre-defined parser) or language as input.

In some cases, the computer can provide a suggestion of a planning template based on a language description provided by a user (e.g., a clinician) and/or derived from patient data. The computer can provide such a suggestion based on an LLM query that the computer generates from an input and using a prompt template. A system providing a suggestion of planning template based on language description provided by an oncologist and/or derived from the patient data.

Training a Machine Learning Language Processing Model for Radiotherapy Treatment Planning The interaction between human experts and radiation therapy (RT) treatment planning system can be inefficient and require special knowledge to understand the impact of different data and user interface components. While large language models (LLMs) provide a novel way to interpret language, the standard, all-purpose, LLMs may not be as proficient in collecting patient attributes for radiotherapy planning or for generating radiotherapy plans as radiotherapy specialists.

Radiotherapy treatment planning can require interaction between an oncologist and a treatment planner who uses planning tools which can require an extensive amount of learning for proper use. Lately, significant effort has been made to increase the automation of the treatment planning process to increase its efficiency because the manual planning process can be slow. However, these efforts don't necessarily reduce the time spent in communication between different specialists, or it would require that oncologists adopt a new set of skills in order to interact directly with the automated planning system.

Recently, LLMs have received a lot of attention and appear to be capable of performing a large variety of tasks related to processing language or code. For example, an LLM can be used to "answer" questions where the answer is generated entirely based on the parameters stored in the LLM itself. Unfortunately, answers obtained by this 'zero-shot' approach tend to often be also wrong. Current LLMs seem to have no awareness about when the proposed answer is entirely 'hallucinated', making its use not feasible in cases where high precision of answers is required.

A more appropriate approach in the radiotherapy field is to use a 'few-shot' learning approach where the information related to the current question is given as part of the LLM feed. In practice, the relevant information is given together with the question or command to the LLM. LLMs can handle relatively long feeds (e.g., several thousands of words). Thus, the language interaction of the oncologist can be converted to instructions for automated planning system in a manner that takes into account the current context (e.g., the current patient information or previous discussions with the patient).

In some cases, however, an RT specialist might differ from the majority of the training corpus used to train the standard LLM, thus potentially reducing the accuracy of LLM text continuations. For the LLM to learn for RT treatment planning, information needs to be in language form instead of data split in a traditional way into data fields in a database.

A computer implementing the systems and methods described herein can overcome the aforementioned technical problems. For example, a computer can provide an interaction in RT treatment planning that is enhanced by a specialized LLM that has been trained specifically to collect patient attributes for radiotherapy treatment planning. The LLM can be trained further with a given set of additional training data to improve its accuracy. LLMs can support the continuing training of the models with additional training data. The systems and methods described herein can collect the necessary data needed for fine-tuning an LLM model and can use such a fine-tuned LLM model as part of completing radiotherapy treatment planning tasks.

Figure 6:
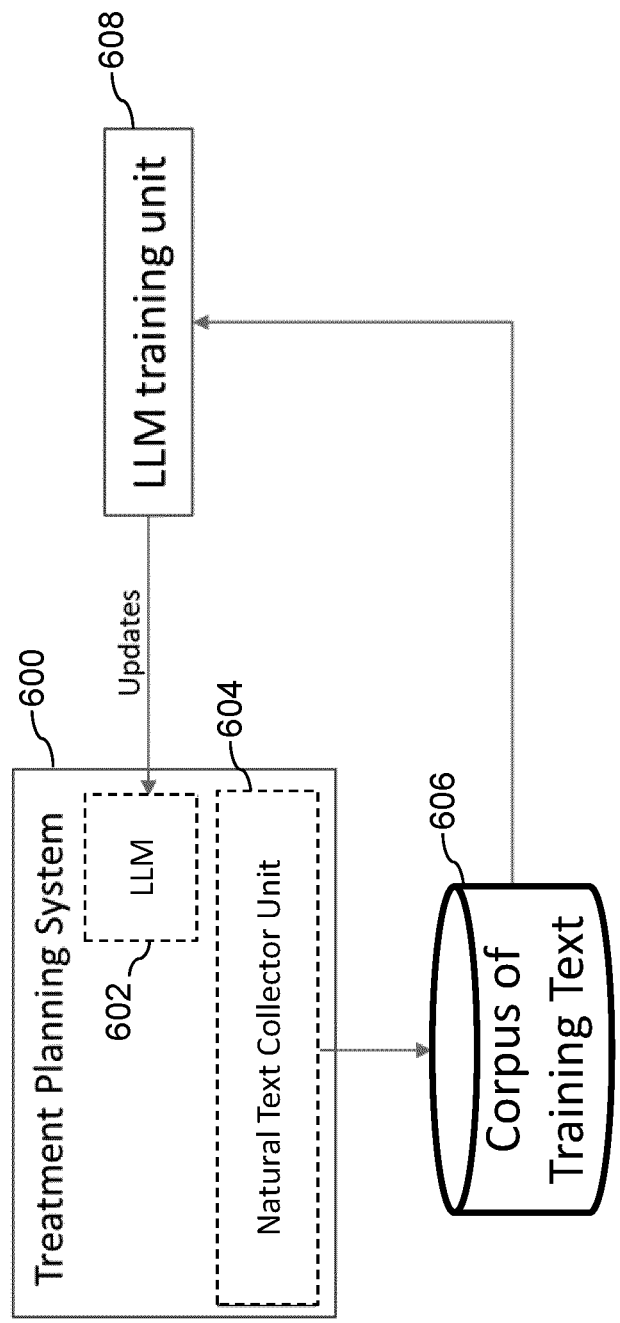
FIG. 6 illustrates a visual representation of processing data to train a machine learning language processing model, in accordance with an embodiment.

For example, as illustrated in FIG. 6, a treatment planning system 600 operating in a training environment can be configured to train and/or use a machine learning language processing model 602. The machine learning language processing model 602 can be an LLM or otherwise be similar to the machine learning language processing model 111 described above. The system 600 can also include a natural text collector unit 604. The natural text collector unit 604 can collect data to be used later in the transfer learning of the machine learning language processing model 602. The collected data can be stored in a corpus of training texts 606, which can be a database for storing training texts. An LLM training unit 608 can use text from the corpus of training texts 606 to update or otherwise train the machine learning language processing model 602.

The collected data can vary and the natural text collector unit 604 itself can have multiple possible implementations. For example, the natural text collector unit 604 can be entirely independent of any usage of an LLM as part of treatment planning activities. For instance, the collected data might only contain the language information related to the patient that was created before the treatment planning started. The collected data can contain, for example, the report of a physician's examination, the statement of a radiologist of the diagnostic CT scans, the statement of a pathologist of any tissue samples, the records from a tumor board meeting, or any information related to the patient history. All this information can be concatenated with the description that was provided as input for the treatment planning system 600.

The data collection can be based on having a new communication tool between the oncologist and the planner. The tool can have two functions. First, the tool can assist and facilitate communication. Second, the tool can record the language interaction between two human experts and store the language interaction as examples of the radiotherapy field language they use.

In some cases, the natural text collector unit 604 can collect natural language interactions and oncologists can mark which parts of the interactions are most relevant. This could either mean to record the full interaction between the LLM-powered treatment planning system 600 and the user or to focus on cases where the users edit the input of the automated planning processes themselves (e.g., cases in which the AI agent failed to provide a correct action based on the language information or was converging too slowly to the correct conclusion).

The scope of the training data collection for the tuning purpose can vary. For example, there can be one globally improved LLM for the purpose of RT, or there can be a nation (or hospital conglomerate)-wide-tuned LLM model. In the nationwide tuned LLM model case, the training process can involve a federated learning approach if the training data cannot leave the hospital premises. For example, LLM models can be trained locally at different hospitals, or any other clinics, based on training data generated at the respective hospitals. A global LLM model can be trained based on updates to the weights and/or parameters of the different local LLM models. In some cases, the training data collection can be for a specific hospital or clinician to generate a machine learning language processing model that is trained to handle local cases. Other ways to divide the training data can be the specific types of patient cases, such as pelvis area cases or head-and-neck cases.

The transfer-learning training step of the LLM can follow a supervised machine learning model training technique. For example, a neural network presenting the current state of LLM can be used to predict the rest of individual training data cases when the beginning part is given as input for the LLM. The predicted continuation is compared to the ground truth and a loss function is applied to evaluate how closely the correct continuation was replicated. The error is propagated back to the neural network to determine how the state of the LLM needs to be changed. As is typical in transfer-learning, the training of the LLM does not start from random parameter initialization but from the state of the original model. The training can also be based on a previously-tuned LLM. The training event can be launched manually when there is enough data available, or it can be done in a regular cadence. It is also possible to use only part of the data if one wants to create a specialized model. In some cases, one can adopt the federated training approach in which a training corpus is split among several databases and the training process can access only one database at a time.

The natural text collector unit 604 can provide automatic anonymization for the collected patient data. For example, the natural text collector unit 604 can replace all tokens related to patient names with generic labels (e.g., 'Patient A') prior to storing the collected patient data in the corpus of training texts 606. The replacing can be done using classical pattern-matching techniques and/or with an LLM prompt.

Advantageously, by implementing the systems and methods described herein, an LLM model can be better trained to collect patient attributes using specific medical language patterns and/or words related to the radiotherapy field. Doing so can be important in the radiotherapy field because medical language used by radiotherapy specialists can be short-worded compared to the language used in other contexts that are typically used to train a generic LLM, such as novels, educational books, or scientific articles. The discussion patterns of radiotherapy specialists can be different from those in books and can resemble more the conversational interaction patterns found in theatre or movies.

In a non-limiting example, an oncologist can access an electronic platform provided by an analytics server. Through the electronic platform, the analytics server can provide a user interface with which the oncologist can interact for radiotherapy treatment planning. For example, the analytics server can provide the user interface to include an interaction pane in which the oncologist can provide input text, images, or video. The analytics server can also include an auxiliary pane in the user interface that illustrates different tasks to perform, such as to generate radiotherapy plans for a different patient. The analytics server can also include a data pane in the user interface that can display patient data for different patients.

The oncologist can communicate with the analytics server by providing inputs into any of the panes of the user interface. For example, the oncologist can write a text input of "show me a CT scan of patient A" into the interaction pane. The analytics server can receive the text input and use the text input to execute a machine learning language processing model to determine the action of retrieving the CT scan of patient A. The analytics server can display the CT of patient A. The oncologist can move the CT scan of patient A into the interaction pane to use as input into the interaction pane.

Through the interaction pane, the oncologist can communicate with the machine learning language processing model to generate a radiotherapy treatment plan. For example, the oncologist can input a request to generate a radiotherapy treatment plan for patient B. The machine learning language processing model can receive the input request and generate a response at the interaction pane requesting for patient attributes of patient B. The oncologist can input different patient attributes into the interaction pane, in some cases after retrieving the patient attributes from the data pane of the user interface. The oncologist can cause such patient attributes to appear on the data pane by inputting a request to view the data through the interaction pane. The machine learning language processing model can process the patient attributes and output response requesting different patient attributes until determining enough patient attributes have been collected to generate a radiotherapy treatment plan (e.g., the patient attributes of patient B satisfy a template or plan condition).

Responsive to determining enough patient data or patient attributes for patient B has been collected, the analytics server can generate a vector of tokens from the patient attributes. The analytics server can input the vector of tokens into a plan optimizer. The plan optimizer can generate a radiotherapy treatment plan for patient B by generating optimized treatment attributes of the radiotherapy treatment plan. The analytics server can display the treatment attributes at the user interface being accessed by the oncologist.

The oncologist can view the radiotherapy treatment plan. The oncologist can determine the radiotherapy treatment plan can be improved and provide an input into the interaction pane indicating the plan can be improved. Responsive to doing so, the machine learning language processing model can generate a query for further patient attributes of patient B. The oncologist can provide further patient attributes and the plan optimizer can generate a new radiotherapy treatment plan based on all of the patient attributes collected for patient B. The analytics server can display the radiotherapy treatment plan on the user interface. The oncologist can accept and implement the radiotherapy treatment.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method comprising:
    presenting, by a processor, a user interface providing an interaction interface between a user and a machine learning language processing model;
    receiving, by the processor from the interaction interface, a first input comprising a first patient attribute of a patient;
    executing, by the processor, the machine learning language processing model using the first patient attribute of the patient as an input to generate a response requesting a second patient attribute of the patient, wherein the processor generates the response when the machine learning processing model predicts that at least one additional patient attribute is needed for a radiotherapy plan optimizer to generate a radiotherapy treatment plan;
    presenting, by the processor, the response requesting the second patient attribute of the patient at the interaction interface;
    receiving, by the processor from the interaction interface, a second input comprising the second patient attribute of the patient; and
    responsive to determining the first patient attribute and the second patient attribute satisfy a plan condition, transmitting, by the processor, the first patient attribute of the patient and the second patient attribute of the patient to the radiotherapy plan optimizer,
        wherein the radiotherapy plan optimizer is configured to generate the radiotherapy treatment plan for the patient based on the first patient attribute and the second patient attribute.

2. The method of claim 1, further comprising:
    receiving, by the processor at the user interface, an input indicating the patient,
    wherein executing the machine learning language processing model comprises:
        retrieving, by the processor, stored patient data regarding the patient from memory based on the input indicating the patient; and
        determining, by the processor, the response based on the input first patient attribute and the retrieved patient data.

3. The method of claim 1, further comprising:
    retrieving, by the processor, a template from memory, the template comprising a list of types of patient attributes,
    wherein executing the machine learning language processing model comprises determining, by the processor, the response based on the input first patient attribute and the template.

4. The method of claim 3, wherein determining the response comprises:
    determining, by the processor, a first type of patient attribute of the list of types of patient attributes of the template based on the machine learning language processing model not receiving a value for the first type of patient attribute from the interaction interface; and
    determining, by the processor, the response requesting for a value of the first type of patient attribute.

5. The method of claim 3, further comprising:
    comparing, by the processor, the first patient attribute and the second patient attribute with the template; and
    determining, by the processor, the first patient attribute and the second patient attribute satisfy the plan condition responsive to determining the first patient attribute and the second patient attribute satisfy a template condition of the template.

6. The method of claim 1, further comprising:
    receiving, by the processor at the user interface, an input indicating the patient;
    presenting, by the processor at the user interface, patient data of the patient based on the input indicating the patient, the patient data comprising one or more patient attributes of the patient; and receiving, by the processor, a selection of the first patient attribute from the presented one or more patient attributes.

7. The method of claim 1, further comprising:

generating, by the processor, a vector of tokens representing the first patient attribute and the second patient attribute from the machine learning language processing model, wherein transmitting the first patient attribute of the patient and the second patient attribute of the patient to the radiotherapy plan optimizer comprises transmitting, by the processor, the vector of tokens representing the first patient attribute and the second patient attribute to the radiotherapy plan optimizer.

8. The method of claim 7, further comprising:

converting, by the processor, the vector of tokens representing the first patient attribute and the second patient attribute into a structured dataset, wherein transmitting the first patient attribute of the patient and the second patient attribute of the patient to the radiotherapy plan optimizer comprises transmitting, by the processor, the converted structured dataset to the radiotherapy plan optimizer.

9. The method of claim 1, wherein the radiotherapy plan optimizer is configured to generate the radiotherapy treatment plan by generating radiation dose information for treating the patient based at least on the first patient attribute and the second patient attribute.

10. The method of claim 1, further comprising:

receiving, by the processor from the user interface, an input indicating the radiotherapy treatment plan is incorrect;

responsive to the input indicating the radiotherapy treatment plan is incorrect, executing, by the processor, the machine learning language processing model to generate a second response requesting a third patient attribute regarding the patient;

presenting, by the processor, the second response requesting the third patient attribute of the patient at the interaction interface;

receiving, by the processor from the interaction interface, a third input comprising the third patient attribute of the patient; and transmitting, by the processor, the first patient attribute of the patient, the second patient attribute of the patient, and the third patient attribute of the patient to the radiotherapy plan optimizer, wherein the radiotherapy plan optimizer is configured to generate a second radiotherapy treatment plan for the patient based on the first patient attribute, the second patient attribute, and the third patient attribute.

11. The method of claim 1, further comprising:

storing, by the processor, a training dataset comprising sets of text regarding radiotherapy treatment of patients; and training, by the processor, the machine learning language processing model using the sets of text regarding radiotherapy treatment of patients of the training dataset as input.

12. The method of claim 1, further comprising:

presenting, by the processor, the radiotherapy treatment plan at the user interface.

13. A system comprising:

a processor coupled to memory and configured to:

present a user interface providing an interaction interface between a user and a machine learning language processing model;

receive, from the interaction interface, a first input comprising a first patient attribute of a patient;

execute the machine learning language processing model using the first patient attribute of the patient as an input to generate a response requesting a second patient attribute of the patient, wherein the processor is configured to generate the response when the machine learning processing model predicts that at least one additional patient attribute is needed for a radiotherapy plan optimizer to generate a radiotherapy treatment;

present the response requesting the second patient attribute of the patient at the interaction interface;

receive, from the interaction interface, a second input comprising the second patient attribute of the patient; and responsive to determining the first patient attribute and the second patient attribute satisfy a plan condition, transmit the first patient attribute of the patient and the second patient attribute of the patient to the radiotherapy plan optimizer, wherein the radiotherapy plan optimizer is configured to generate the radiotherapy treatment plan for the patient based on the first patient attribute and the second patient attribute.

14. The system of claim 13, wherein the processor is further configured to:

receive, at the user interface, an input indicating the patient, wherein the processor is configured to execute the machine learning language processing model by:

retrieving stored patient data regarding the patient from memory based on the input indicating the patient; and determining the response based on the input first patient attribute and the retrieved patient data.

15. The system of claim 13, wherein the processor is further configured to:

retrieve a template from memory, the template comprising a list of types of patient attributes, wherein the processor is configured to execute the machine learning language processing model by determining the response based on the input first patient attribute and the template.

16. The system of claim 15, wherein the processor is configured to determine the response by:

determining a first type of patient attribute of the list of types of patient attributes of the template based on the machine learning language processing model not receiving a value for the first type of patient attribute from the interaction interface; and determining the response requesting for a value of the first type of patient attribute.

17. The system of claim 15, wherein the processor is further configured to:

compare the first patient attribute and the second patient attribute with the template; and determine the first patient attribute and the second patient attribute satisfy the plan condition responsive to determining the first patient attribute and the second patient attribute satisfy a template condition of the template.

18. The system of claim 13, wherein the processor is further configured to:

receive, at the user interface, an input indicating the patient;

present, at the user interface, patient data of the patient based on the input indicating the patient, the patient data comprising one or more patient attributes of the patient; and receive a selection of the first patient attribute from the presented one or more patient attributes.

19. The system of claim 13, wherein the processor is further configured to:

generate a vector of tokens representing the first patient attribute and the second patient attribute from the machine learning language processing model, wherein the processor is configured to transmit the first patient attribute of the patient and the second patient attribute of the patient to the radiotherapy plan optimizer by transmitting the vector of tokens representing the first patient attribute and the second patient attribute to the radiotherapy plan optimizer.

20. The system of claim 19, wherein the processor is further configured to:

convert the vector of tokens representing the first patient attribute and the second patient attribute into a structured dataset, wherein the processor is configured to transmit the first patient attribute of the patient and the second patient attribute of the patient to the radiotherapy plan optimizer by transmitting the converted structured dataset to the radiotherapy plan optimizer.

\* \* \* \* \*